(12) United States Patent
Hatakeyama et al.

(10) Patent No.: US 7,258,452 B2
(45) Date of Patent: Aug. 21, 2007

(54) PROJECTION OPTICAL SYSTEM AND A PROJECTION TYPE IMAGE DISPLAY APPARATUS

(75) Inventors: Koshi Hatakeyama, Tochigi (JP); Tsunefumi Tanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 285 days.

(21) Appl. No.: 10/964,949

(22) Filed: Oct. 14, 2004

(65) Prior Publication Data

US 2005/0078281 A1   Apr. 14, 2005

(30) Foreign Application Priority Data

Oct. 14, 2003  (JP)  ............... 2003-353810

(51) Int. Cl.
*G03B 21/14* (2006.01)
*G03B 3/00* (2006.01)

(52) U.S. Cl. .................. 353/101; 353/100; 353/30; 359/676

(58) Field of Classification Search ............... 353/100, 353/101, 30; 359/676, 701
See application file for complete search history.

(56) References Cited

U.S. PATENT DOCUMENTS

| | | | | |
|---|---|---|---|---|
| 3,588,226 | A | * | 6/1971 | Ikezu .................. 359/673 |
| 5,820,240 | A | | 10/1998 | Ohzawa |
| 5,825,560 | A | | 10/1998 | Ogura et al. |
| 5,847,887 | A | | 12/1998 | Ogura et al. |
| 6,021,004 | A | | 2/2000 | Sekita et al. |
| 6,099,128 | A | * | 8/2000 | Jessl .................. 353/51 |
| 6,123,425 | A | * | 9/2000 | Ohzawa .................. 353/69 |
| 6,166,866 | A | | 12/2000 | Kimura et al. |
| 6,292,309 | B1 | | 9/2001 | Sekita et al. |
| 6,366,411 | B1 | | 4/2002 | Kimura et al. |
| 6,522,475 | B2 | | 2/2003 | Akiyama et al. |
| 6,877,862 | B2 | * | 4/2005 | Fukunaga et al. ......... 353/70 |
| 6,906,867 | B2 | * | 6/2005 | Nagata .................. 359/676 |
| 6,926,412 | B2 | * | 8/2005 | Kim et al. .................. 353/94 |
| 2002/0008853 | A1 | | 1/2002 | Sunaga |

FOREIGN PATENT DOCUMENTS

| | | |
|---|---|---|
| JP | 8-292371 | 11/1996 |
| JP | 8-292372 | 11/1996 |
| JP | 9-005650 | 1/1997 |
| JP | 9-222561 | 8/1997 |
| JP | 9-304733 | 11/1997 |
| JP | 10-282451 | 10/1998 |
| JP | 2000-089227 | 3/2000 |
| JP | 2001-255462 | 9/2001 |

* cited by examiner

*Primary Examiner*—W. B. Perkey
*Assistant Examiner*—Robert Do
(74) *Attorney, Agent, or Firm*—Morgan & Finnegan LLP

(57) ABSTRACT

There is disclosed a projection optical system which is capable of moving a projected image within a predetermined region (effective projection region). The projection optical system, which projects an image of an object surface in the effective projection region of a predetermined image surface comprises two or more optical systems, among which a first optical system on the object surface side comprises a zoom portion which zooms the projected image. The projection optical system further comprises one or more rotatable members which rotate around the position of an exit pupil of the first optical system or its vicinity. In addition, by rotating the one or more rotatable members, the projected image is moved within the effective projection region.

13 Claims, 31 Drawing Sheets

FIG. 6A
WIDE
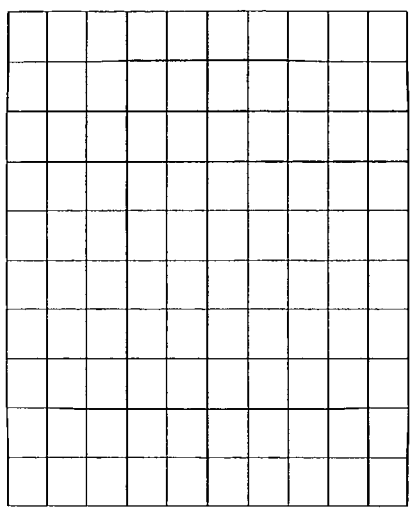
MIDDLE
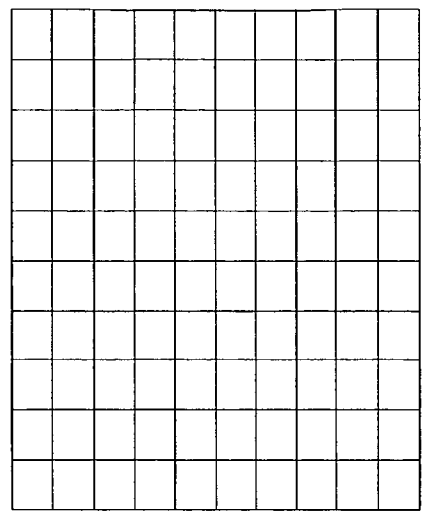
TELE
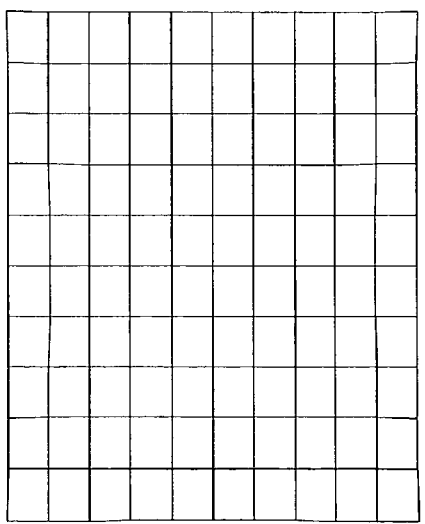
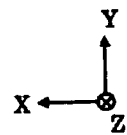

FIG. 17

|  | Z1 | Z2 | Z3 | Z4 | Z5 | Z6 | Z7 | Z8 |
|---|---|---|---|---|---|---|---|---|
| M1 | N | N | N | N | N | N | N | K |
| M2 | N | N | N | N | N | N | K | Y |
| M3 | N | N | N | N | N | K | Y | Y |
| M4 | N | N | N | N | K | Y | Y | Y |
| M5 | N | N | N | K | Y | Y | Y | Y |
| M6 | N | N | K | Y | Y | Y | Y | Y |
| M7 | N | K | Y | Y | Y | Y | Y | Y |
| M8 | K | Y | Y | Y | Y | Y | Y | Y |
| M9 | K | Y | Y | Y | Y | Y | Y | Y |
| M10 | N | K | Y | Y | Y | Y | Y | Y |
| M11 | N | N | K | Y | Y | Y | Y | Y |
| M12 | N | N | N | K | Y | Y | Y | Y |
| M13 | N | N | N | N | K | Y | Y | Y |
| M14 | N | N | N | N | N | K | Y | Y |
| M15 | N | N | N | N | N | N | K | Y |
| M16 | N | N | N | N | N | N | N | K |

PROJECTION OPTICAL SYSTEM AND A PROJECTION TYPE IMAGE DISPLAY APPARATUS

This application claims priority from Japanese Patent Application No.2003-353810 filed on Oct. 14, 2003, which is hereby incorporated by reference herein.

BACKGROUND OF THE INVENTION

1. Field of the Invention

The present invention relates to a projection optical system, and more specifically, it relates to a projection optical system suitable for a projection type image display apparatus which projects images to be displayed on an image display panel, of which a liquid crystal display element or a digital micro-mirror device is representative, onto a screen surface in a magnified scale.

2. Description of the Related Art

As a projection optical system to be used for a projection type image display apparatus (a projection) which projects images onto a predetermined surface (a screen surface), a projection optical system which can project images obliquely onto the screen in order to perform image projection without obstructing the visual field of viewers is known. Generally, since so-called trapezoidal distortion occurs when projecting images obliquely onto the screen, there is known a projection optical system which is made to correct this trapezoidal distortion (for example, U.S. Pat. Nos. 5,820,240 and 6,123,425 and Japanese Patent Application Laid-Open No. H10-282451). In Japanese Patent Application Laid-Open No. H09-304733, a projection optical system for rotating a projected image surface using coaxial rotationally symmetric f-θ lenses in a state in which there is no trapezoidal distortion of the projected image due to rotationally decentering a lens unit around a stop is disclosed. Further, in Japanese Patent Application Laid-Open No. H10-282451, a projection optical system for correcting the trapezoidal distortion at a fixed projection angle by using a decentered aspherical surface is disclosed.

Meanwhile, in non-coaxial optical systems, a design method or method of calculating paraxial amounts such as the focal length is known (for example, Japanese Patent Application Laid-Open No. H09-005650). Further, it has become clear that it is possible to construct optical systems with sufficient correction of aberrations by introducing the concept of reference axis and using asymmetric aspherical surfaces as the structural surfaces (for example, U.S. Pat. Nos. 5,825,560, 5,847,887, 6,021,004, 6,166,866, 6,292,309, 6,366,411, and 6,522,475). Such non-coaxial optical systems are referred to as an off-axial optical system. Generally, such off-axial optical systems are defined as optical systems which, when the path of the light ray passing through the image center and the pupil center is defined as the reference axis, include curved surfaces (off-axial curved surfaces) whose surface normal at the intersection of the structural surface with the reference axis is not on the reference axis. Here, the reference axis takes on a bent shape. In such off-axial optical systems, the structural surfaces are ordinarily non-coaxial, and there is no vignetting at the reflective surfaces. Thus, it is easy to construct an optical system using the reflective surfaces. Moreover, a compact optical system with a broad field angle can be constructed by forming an intermediate image within the optical system. In addition, the light path can be guided relatively freely while using a front-stop optical system, so that a compact optical system can be constructed. Utilizing these characteristics, an optical system in which the trapezoidal distortion at the fixed projection angle is corrected using curved rotationally asymmetric reflective surfaces has been proposed (for example, US Patent Application Publication No. 2002-008853 and Japanese Patent Application Laid-Open No. 2000-089227).

Further, a recent projection type image display apparatus comprises a projection optical system in which a projected image can be moved in parallel on a predetermined image surface with no trapezoidal distortion, in order to secure the visual field of viewers and improve the degree of freedom for setup positions for the projection type image display apparatus.

The methods for moving the projected image in parallel are broadly divided into two types. One method relates to a digital correction in which images to be displayed on an image display panel is distorted in advance in a trapezoidal shape so as to offset the trapezoidal distortion which is produced on a predetermined image surface (on a projection surface). In this case, in order to produce virtually an inversed trapezoidal distortion on the image display panel, the number of pixels on which images are to be actually displayed is decreased in comparison with the amount of original information, which results in deteriorating images. Further, when image information created in a personal computer or the like is displayed, there are many cases in which characters or figures or the like are displayed on the periphery of the image surface. However, the small-sized characters or figure patterns may be unrecognizable due to pixel faults of the digital correction.

Another method relates to a lens shift. In this case, the central axis of the image display panel and coaxial projection lenses is shifted relatively in parallel, such that the projected image is moved in parallel on the predetermined image surface. Conventionally, in a front projection type projector, this method is used to secure the observer's view. More specifically, in the front projection type projector, the center of the display screen is fixed above the optical axis of coaxial lenses in the projector using approximately a half of an effective field angle of the projection optical system with respect to the optical axis.

Further, in such a projector, the parallel decentering amount of the coaxial lenses on the image display panel is made to be variable, to thereby move the projected image on the predetermined image surface. However, if the amount of the movement of the projected image increases, the size of the projection optical system is magnified. Thus, the amount of the movement is naturally small, and the tilt angle of the projection to the predetermined image surface becomes small. As a result, it is difficult to secure sufficiently the observer's view and to obtain the degree of freedom for setup positions of the projection type image display apparatus.

In addition, the size of a region (an effective projection region) on which the projection can be performed is magnified or demagnified in proportional to a zoom ratio of the projection optical system even though any method is selected. Therefore, the ratio of the image size to the movement amount is constant. As a result, when the size of the image surface is smaller (a telephoto side), the degree of freedom for the setup positions of the apparatus is compromised.

In Japanese Patent Application Laid-Open No. H09-304733, the projection optical system uses a combination of coaxial rotationally symmetric f-θ optical systems, but it has a rather narrow field angle. Moreover, in conventional projection lenses, the light amount is reduced as the field angle from the optical axis up to the periphery of the image surface becomes large, so that there are greater differences in the brightness on the projected image surface when a broader field angle of the projection lens is used.

For this reason, such projection lenses are not suited for projectors which necessitate a broad field angle and a bright image surface. In Japanese Patent Application Laid-Open No. H10-282451, the trapezoidal distortion is corrected with the decentered aspherical surfaces. However, since it is a projection optical system which can correct the trapezoidal distortion only at a fixed projection angle, the shift amount of the image surface is small and it is not telecentric with respect to the liquid crystal panel. In Japanese Patent Application Laid-Open Nos. 2001-255462 and 2000-089227, the projection optical systems are disclosed in which the correction of the trapezoidal distortion over a broad field angle is accomplished using curved rotationally asymmetric reflective surfaces. However, they are projection optical systems in which the trapezoidal distortion can be corrected only at a fixed projection angle.

SUMMARY OF THE INVENTION

It is an object of the present invention to suggest a projection optical system and a projection type image display apparatus which are capable of obtaining a projected image with no distortion within an effective projection region and moving easily the projected image within the effective projection region even when the projected image is magnified or demagnified within the effective projection region.

According to a first aspect of the present invention, there is provided a projection optical system which projects an image of an object surface as a projected image in an effective projection region of a predetermined image surface, which comprises two or more optical systems, a first optical system among the two or more optical systems comprising a zoom portion which zooms the projected image; and one or more rotatable members which rotates around the position of an exit pupil of the first optical system or its vicinity, in which, by rotating the one or more rotatable members, the projected image is moved within the effective projection region.

According to a second aspect of the present invention, in the projection optical system of the first aspect, a second optical system on the image surface side among the two or more optical systems comprises a plurality of reflective surfaces having curvature.

According to a third aspect of the present invention, in the projection optical system of the first aspect, the second optical system on the image surface side among the two or more optical systems guides the projected image by the first optical system and projects the projected image on a plane obliquely tilted to a principal ray to be emitted from the first optical system.

According to a fourth aspect of the present invention, in the projection optical system of the first aspect, the first optical system comprises coaxial rotationally symmetric lenses.

According to a fifth aspect of the present invention, in the projection optical system of the first aspect, the first optical system forms an image of the object side on an approximately spherical surface.

According to a sixth aspect of the present invention, in the projection optical system of the first aspect, the position of the exit pupil of the first optical system is substantially constant during zoom operation of the zoom portion.

According to a seventh aspect of the present invention, in the projection optical system of the first aspect, the position of the exit pupil of the first optical system is disposed between the first optical system and a second optical system on the image surface side.

According to an eighth aspect of the present invention, in the projection optical system of the first aspect, one of the one or more rotatable members is the first optical system.

According to a ninth aspect of the present invention, in the projection optical system of the first aspect, one of the one or more rotatable members is the second optical system on the image surface side.

According to a tenth aspect of the present invention, in the projection optical system of the first aspect, one of the one or more rotatable members is a planar mirror provided in the position of the exit pupil of the first optical system or its vicinity.

According to an eleventh aspect of the present invention, in the projection optical system of the first aspect, during zoom operation by the first optical system, the size of the effective projection region is substantially constant.

According to a twelfth aspect of the present invention, in the projection optical system of the first aspect, the one or more rotatable members are planar mirrors arranged in the position of the exit pupil of the first optical system or its vicinity, and by rotating the planar mirrors around the position of the exit pupil of the first optical system or its vicinity, the projected image is moved in the effective projection region of the predetermined image surface.

According to a thirteenth aspect of the present invention, there is provided a projection type image display apparatus, which comprises an image display panel; and a projection optical system of the first aspect, which projects an image of the image display panel onto an effective projection region on a predetermined image surface.

According to a fourteenth aspect of the present invention, in the projection type image display apparatus of the thirteenth aspect, the projection type image display apparatus further comprises a control member which controls the zoom position of the zoom portion and the rotation angle of the one or more rotatable members such that the projected image is moved within the effective projection region.

According to a fifteenth aspect of the present invention, in the projection type image display apparatus of the thirteenth aspect, the projection type image display apparatus according to the thirteenth aspect satisfies the following expression:

$$|\omega_{r,z} \cdot S_{r,z}/(M \cdot \theta_{Mr,z} L_{r,z})|-1|<0.2,$$

where $\theta_{Mr,z}$ is the rotation amount of the rotatable member in the horizontal or vertical-direction r at a zoom ratio z of the zoom portion, $\omega_{r,z}$ is the maximum half field angle of the exit side of the first optical system disposed at the object surface side, $L_{r,z}$ is half the image surface size of the image display surface of the effective projection region, $S_{r,z}$ is the movement amount of the image display surface, and M is a parameter depending on the rotatable member. When the rotatable member is the first optical system disposed at the object surface side or the second optical system disposed at the image surface side, M is 1, and when the rotatable member is the planar mirror, M is 2.

According to the present invention, a plurality of optical systems are provided in the projection optical system, and each of the optical systems has a predetermined role. Thus, it is possible to move or incline the projected image in the predetermined image surface.

Features of the projection optical system and the projection type image display apparatus according to the present invention will be apparent from the following descriptions of preferred embodiments thereof taken in conjunction with the accompanying drawings.

BRIEF DESCRIPTION OF THE DRAWINGS

FIGS. 6B to 6D and FIG. 6A show diagrams illustrating the lateral aberration and distortion of an optical system C' at the object surface side according to Embodiment 1 of the present invention.

FIG. 17 shows a map of the evaluation value of the projection type image display apparatus according to Embodiment 2 of the present invention.

DETAILED DESCRIPTION OF THE PREFERRED EMBODIMENTS

Figure 12:
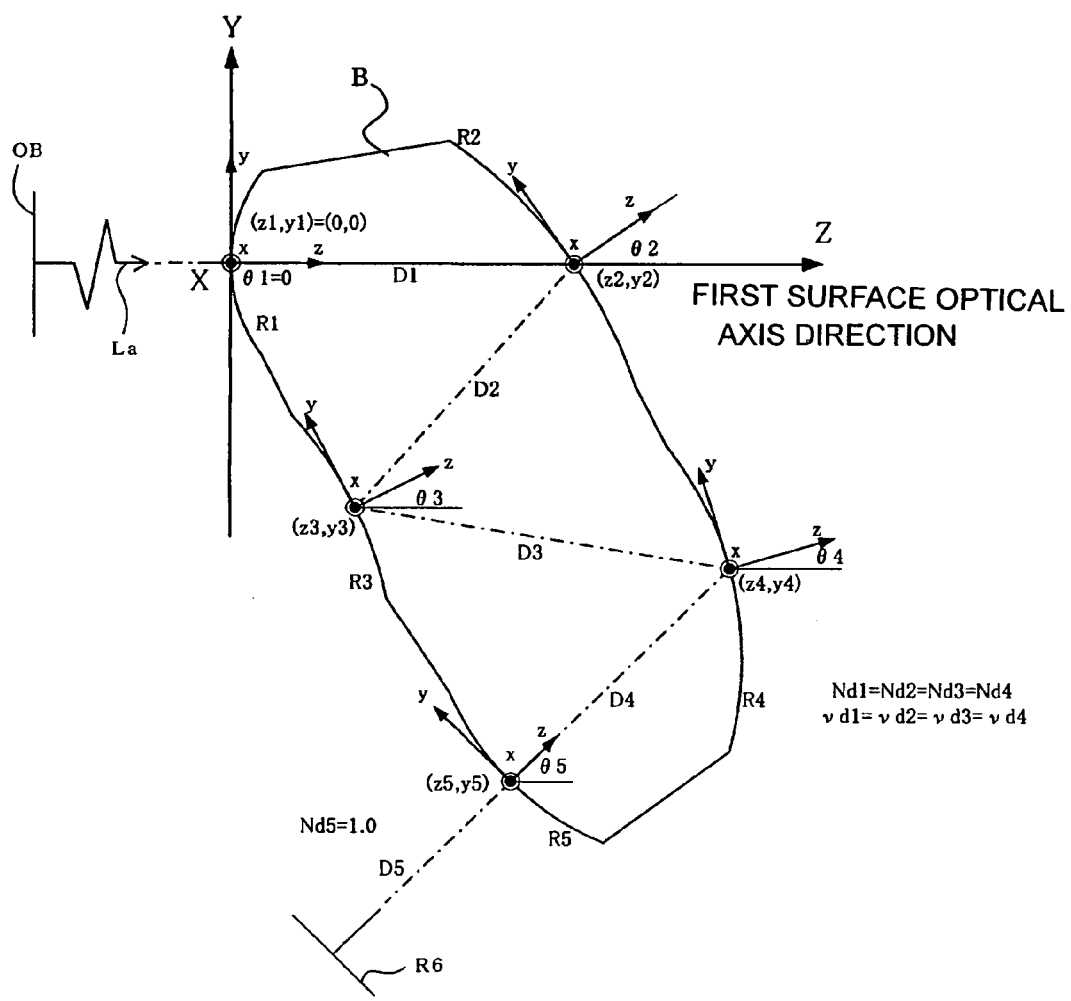
FIG. 12 shows a diagram illustrating coordinate systems in the present invention.

Before going into the description of the respective embodiments of the present invention, the notations for structural aspects in the respective embodiments and overall common items of the embodiments will be described. FIG. 12 shows a diagram of a coordinate system in which the structural data of the optical elements constituting the optical systems of the present invention are defined. In the present embodiments of the present invention, an i-th surface is defined to be the i-th surface along the path of a single light ray (dash-dot line indicated in FIG. 12 and referred to as the reference axis ray La) traveling from the object side to the image surface. Further, in the descriptions regarding the optical systems of the present invention, the object surface onto which images are projected is represented as a screen or predetermined image surface, the projected image is represented as an image, an image surface or a picture surface, and the magnification or demagnification of the image is represented as a zoom or variable magnification. These representations can be freely substituted.

In FIG. 12, a first surface R1 is a refractive surface, a second surface R2 is a reflective surface which is tilted with respect to the first surface R1, a third surface R3 and a fourth surface R4 are reflective surfaces which are both shifted and tilted with respect to the surface respectively preceding them, and a fifth surface R5 is a refractive surface which is shifted and tilted with respect to the fourth surface R4. The various surfaces from the first surface R1 to the fifth surface R5 are constructed with a single optical element, which is made of a medium such as glass or plastic and is shown as a first optical element B in FIG. 12.

Therefore, in the structure in FIG. 12, the medium from the object surface OB to the first surface R1 is made of air, the mediums from the first surface R1 to the fifth surface R5 are made of any common material, and the medium from the fifth surface R5 to a sixth surface R6 which corresponds to the screen surface is made of air.

The optical system of the present invention is an off-axial optical system, which means that various surfaces constituting the optical system do not have a common optical axis. Accordingly, in the embodiments of the present invention, an absolute coordinate system is firstly set, of which the origin is defined as the center of the first surface R1.

Further, in the embodiments of the present invention, while the center of the first surface R1 is set as the origin, the path of the light ray (reference axis ray) La passing through the origin and the center of the final imaging surface (R6) is defined as the reference axis of the optical system. In addition, the reference axis in the embodiments is directional. The direction of the reference axis is the direction in which the reference axis ray travels during image formation.

In the embodiments of the present invention, the reference axis serving as the reference of the optical system is set as explained above. When the axis serving as the reference of the optical system is selected, an axis which is appropriate with regard to the optical design to accounting for aberrations, or to expressing the surface shapes constituting the optical system can be adapted. Typically, however, the path of a light ray passing through the center of the image surface and any one of the center of a stop, an entrance pupil, the center of the first surface constituting the optical system, and the center of the final surface constituting the optical system is set as the reference axis serving as the reference of the optical system.

That is to say, in the embodiments of the present invention, the path over which the light ray (reference axis ray) La passing through the center of the first surface R1 and reaching the center of the final image-formation surface R6 is refracted and reflected by the refractive and reflective surfaces is defined as the reference axis. The order of the surfaces is set as the order of the surfaces at which the reference axis ray La is refracted or reflected.

Therefore, the reference axis changes its direction in accordance with the rules for refraction or reflection on the various surfaces in the set order, and finally reaches the center of the image surface. Moreover, in the embodiments of the present invention, the object surface side, the panel surface side, the predetermined image surface side, the image surface side and the screen side indicate the sides with respect to the direction of the reference axis.

Various axes of the absolute coordinate system of the optical system according to the respective embodiments of the present invention are defined as follows.

Z axis: A straight line passing through the origin and the center of the object surface OB. The direction from the object surface OB toward the first surface R1 is defined as positive.

Y axis: A straight line passing through the origin and forming an angle of 90° counterclockwise rotation with the Z axis, in accordance with the definition of a right-handed coordinate system.

X axis: A straight line passing through the origin and perpendicular to the Z axis and the Y axis.

Moreover, in order to express the surface shape and the tilt angle of the i-th surface constituting the optical system, a local coordinate system is defined by taking the point at which the reference axis intersects with the i-th surface as the origin. Expressing the surface shape of the surface in the local coordinate system and expressing the tilt angle as the angle defined by the reference axis and the local coordinate system makes shape and angle more intuitive than annotating the shape and tilt angle of that surface in the absolute coordinate system. Thus, the surface shape of the i-th surface is expressed by the following local coordinate system. For this purpose, first, the following coordinate system on the reference axis is defined with respect to any given point on the reference axis:

zb axis: A straight line passing through a given point on the reference axis. In this case, the direction of the reference axis is defined as positive. At the point where the reference axis is deflected, the incidence direction is defined as positive.

yb axis: A straight line passing through a given point on the reference axis and forming an angle of 90° counterclockwise rotation with the zb axis in accordance with the definition of a right-handed coordinate system. At the origin of the absolute coordinate system, the yb axis coincides with the Y axis of the absolute coordinate system, and thereafter, there will be no rotation with respect to the zb axis.

xb axis: A straight line passing through a given point on the reference axis and perpendicular to the zb axis and the yb axis.

Next, the local coordinate system is defined.

z axis: A surface normal passing through the origin of the local coordinate system.

y axis: A straight line passing through the origin of the local coordinate system and forming an angle of 90° counterclockwise rotation with the z axis in accordance with the definition of a right-handed coordinate system.

x axis: A straight line passing through the origin of the local coordinate system and perpendicular to the ybzb plane.

Figure 13:
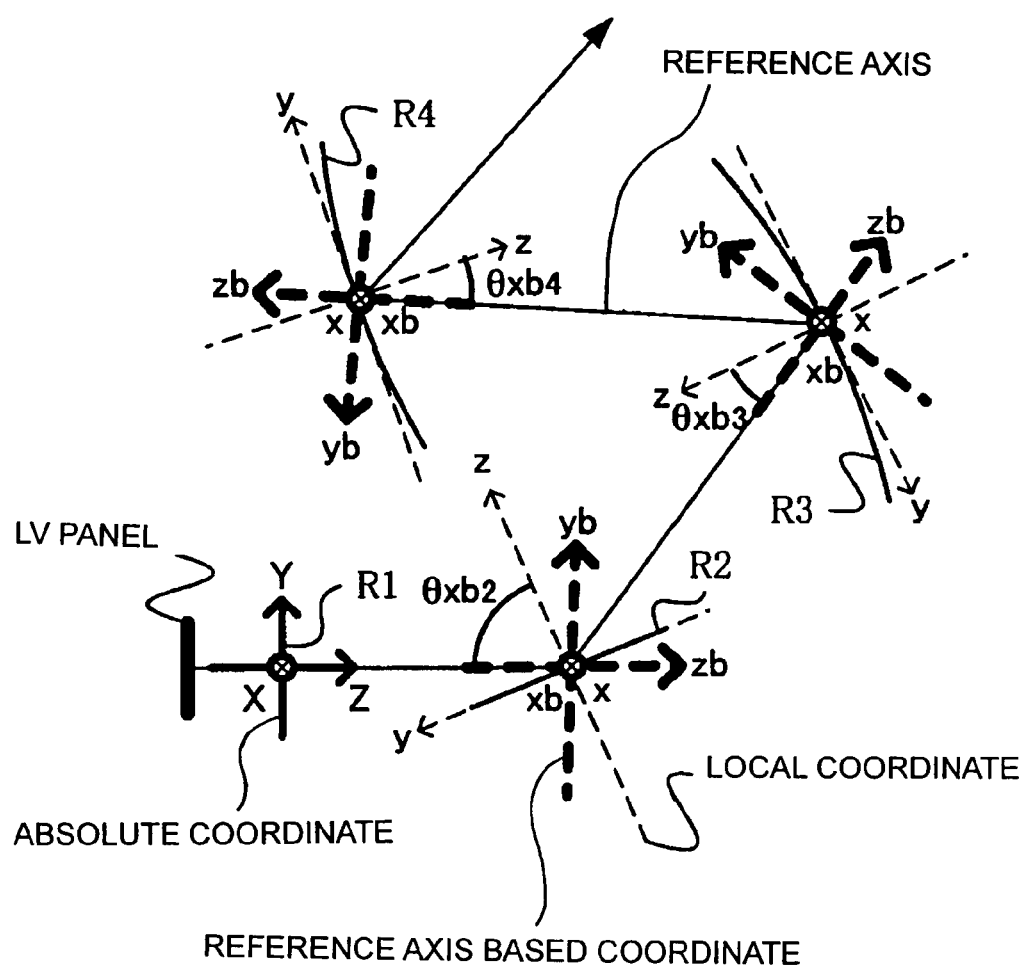
FIG. 13 shows a diagram illustrating the absolute coordinate system, the coordinate system based on the reference axis, and the local coordinate system in the present invention.

Therefore, the tilt angle in the ybzb plane of the i-th surface is represented as the angle θxb,i (in degrees) between the z axis of the local coordinate system and the zb axis of the coordinate system on the reference axis, defining the counterclockwise direction in which the two axes form a sharp angle as positive. The tilt angle in the xbzb plane of the i-th surface is represented as the angle θyb,i (in degrees) to the zb axis of the coordinate system on the reference axis, defining the counterclockwise direction as positive. The tilt angle in the xbyb plane of the i-th surface is represented as the angle θzb,i (in degrees) to the yb axis of the absolute coordinate system, defining the counterclockwise direction as positive. Normally, however, θzb,i corresponds to a rotation of the surface and is disregarded in the embodiments of the present invention. FIG. 13 shows the relationship between the absolute coordinate system, the coordinate system on the reference axis and the local coordinate system.

Moreover, Di is a scalar quantity representing the distance between the origins of the local coordinate systems of the i-th surface and the (i+1)th surface, and Ndi and vdi are, respectively, the refractive index and the Abbe constant of the medium between the i-th surface and the (i+1)th surface.

Here, the shape of spherical surfaces is expressed by the following expression:

$$z = \frac{(x^2+y^2)/Ri}{1+\{1-(x^2+y^2)/Ri^2\}^{1/2}} \quad \text{[Expression 1]}$$

Moreover, the optical system of the present invention has at least one rotationally asymmetric aspherical surface whose shape can be expressed by the following expression:

$z = C02y^2 + C20x^2 + C03y^3 + C21x^2y + C04y^4 + C22x^2y^2 +$
$\quad C40x^4 + C05y^5 + C23x^2y^3 + C41x^4y + C06y^6 +$
$\quad C24x^2y^4 + C42x^4y^2 + C60x^6$ In this curved surface expression, all x's have even exponents, so that the curved surface given by this curved surface expression is plane symmetric with the yz plane as the symmetry plane. Moreover, if the following condition is satisfied, the above expression represents a shape which is symmetric with respect to the xz plane:

C03=C21=C05=C23=C41=t=0

In addition, when

C02=C20

C04=C40=C22/2 and

C06=C60=C24/3=C42/3 are satisfied, the above expression represents a rotationally symmetric shape. If these conditions are not satisfied, it represents a rotationally asymmetric shape.

Figure 11:
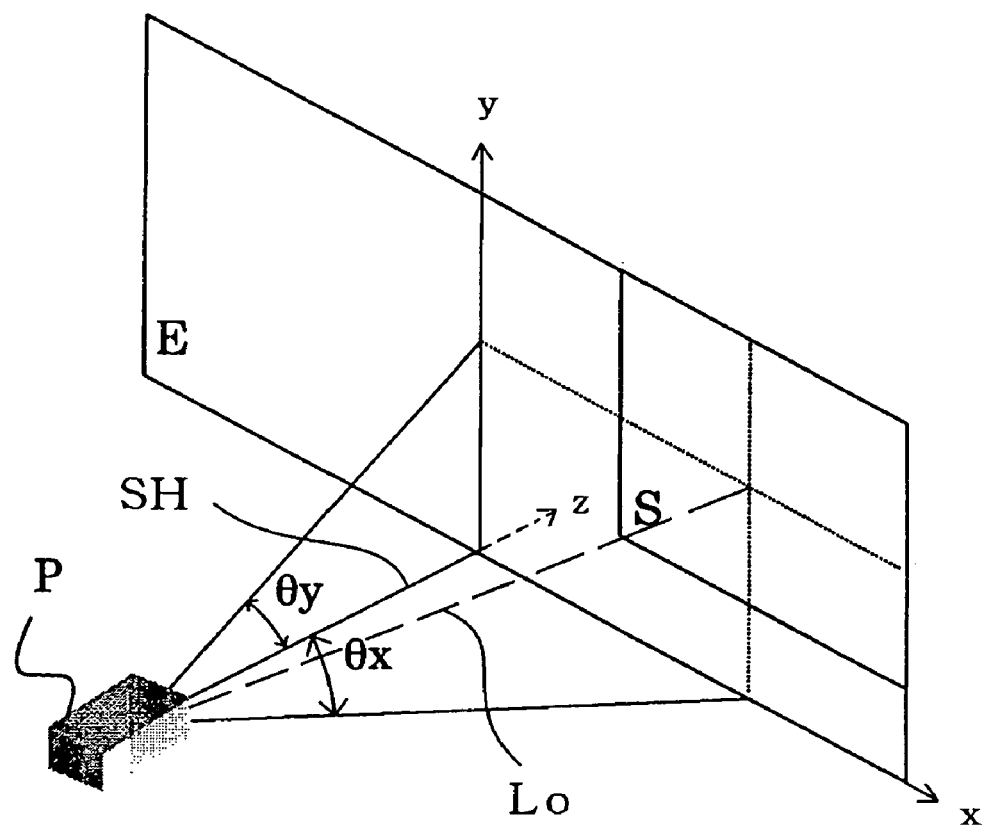
FIG. 11 shows a diagram illustrating the projection angle in the present invention.

Next, in the present invention, the projection angle of the optical system for moving or tilting of the image surface is defined. FIG. 11 shows the positional relationship between a screen and an image surface in the projection optical system of the present invention. P denotes a projection optical system having a zoom function of the present invention and a projection type image display apparatus comprising the projection optical system, and S denotes an image display surface (image surface) on which the image is actually projected from the projection optical system within the projection type image display apparatus P to thereby perform the image display. Further, E denotes a region through which the image display surface S can be moved while maintaining favorable image-forming performance. This region E is referred to as an effective projection region. Moreover, the position of the image surface S within the effective projection region E is represented by the angles formed by the normal SH on the screen surface and the x and y components of the reference axis Lo reaching the center of the image surface S from the center of the exit pupil SSa of the projection optical system, which are defined as the projection angles θx and θy. Here, the image display surface (screen surface) S and the effective projection region E are tilted to the above-mentioned reference axis ray. In addition, they are also tilted to an optical axis (reference axis ray) of light flux to be emitted from the optical system C (the optical system on the image display panel side in the projection optical system) described below. Further, the size of the effective projection region E is substantially constant during the zoom operation, and the ratio of the maximum area to the minimum area during the zoom operation is 130 percent or less (preferably, 110 percent or less).

Figure 10A:
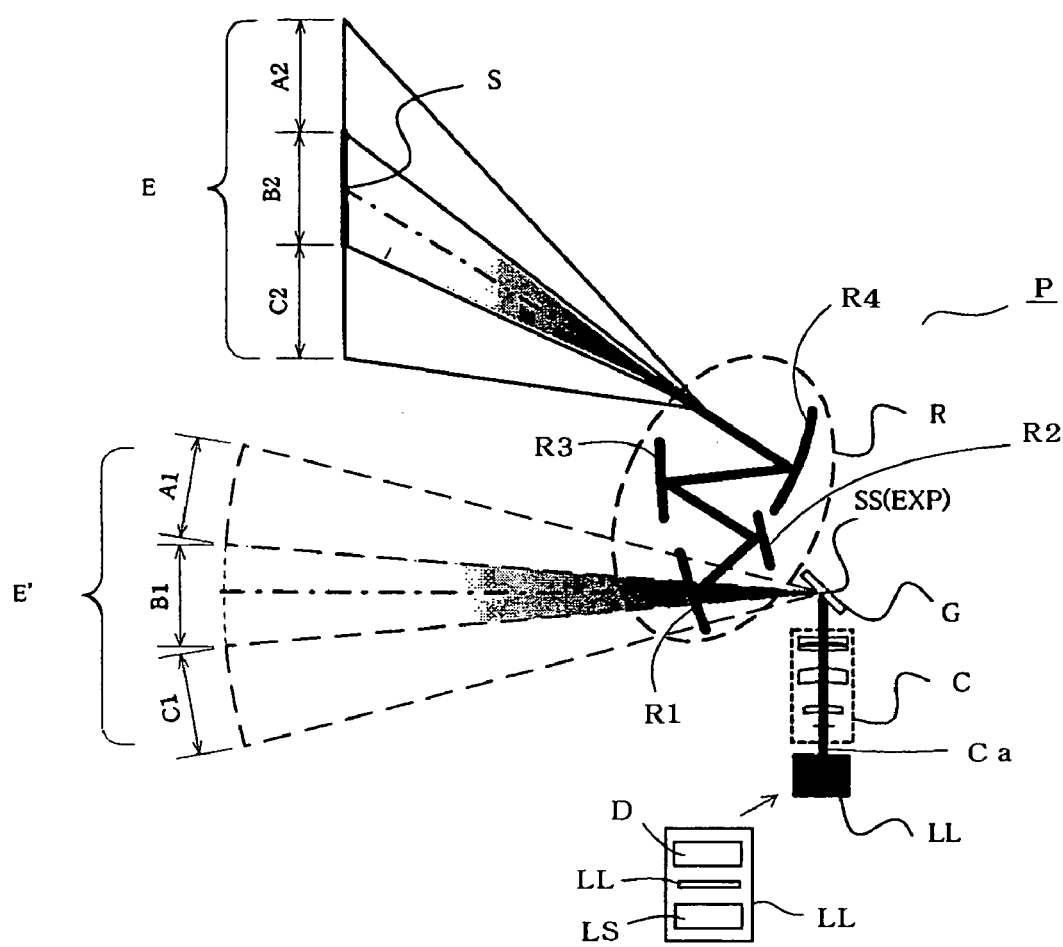
FIG. 10A shows a diagram illustrating the principle for varying the projection angle in the present invention.

In the projection type image display apparatus of the present invention, the basic principle for realizing a projection angle variation while maintaining favorable optical performance will be described. FIG. 10A shows a principle of a projection optical system P of the present invention. In FIG. 10A, although not shown in detail, LL denotes an illumination system comprising a light valve (image display panel) LV using a liquid crystal or a reflective dot matrix liquid crystal or a digital micro-mirror device or the like, a light source device LS for illuminating light onto the light valve LV, and a color combining prism D. C denotes an optical system having image-forming performance. The optical system C comprises lenses and has a zooming (variable magnification) function. Ca denotes an optical axis of the optical system C. Light from the illumination system LL passes through the optical system C is reflected by a rotatable mirror G which is provided at a position of a stop SS (corresponding to a position of an exit pupil EXP) of the optical system C or its vicinity. Based on the image display panel LV, an image is projected and formed onto a region B1 on a spherical surface E' of which the center of curvature is at the exit pupil EXP. Needless to say, it is only required to satisfy that the optical system C has the capability to form an image onto the region B1 on the spherical surface E', so that it may be a coaxial rotationally symmetric optical system or an optical system including a curved reflective surface as a structural element. Moreover, the stop SS of the optical system C does not necessarily have to coincide with the exit pupil EXP. In the case where the stop SS is arranged to be shifted from the exit pupil EXP of the optical system C, the rotatable mirror G may be provided at the position of the exit pupil EXP. Here, the rotatable mirror G is preferably arranged in the position of the exit pupil or its vicinity. Here, the term 'vicinity' implies that part of the region, which reflects light from the optical system C, among the reflective surfaces of the rotatable mirror, is disposed at the position of the exit pupil. (The surface of the exit pupil and the position of the rotatable mirror which reflects light may intersect.) Further, the distance from the part of the position, which reflects light from the optical system C, among the reflective surfaces of the rotatable mirror G, to the exit pupil of the optical system C is preferably shorter than the radius of the aperture of the stop SS. In addition, the rotation center axis of the rotatable mirror G is preferably arranged in the position of the exit pupil of the optical system C or its vicinity (the distance from the exit pupil surface is equal to or less than the radius of the aperture of the stop SS, or equal to or less than the radius or the longest radius at the exit pupil surface of light flux to be emitted from the optical system C).

In this situation, if the rotatable mirror G rotates in the paper plane, the image on the region B1 moves to regions A1 and C1 while maintaining optical performance. That is to say, the image continuously moves on the spherical surface E'. Next, as shown in FIG. 10A, an optical system R including a plurality of curved reflective surfaces R1 to R4 as structural elements is arranged in the forward direction of the rotatable mirror G (light emitting side), so that the image to be projected by the optical system C is guided to the optical system R. In this situation, the optical system R is designed using a non-coaxial optical system or the like such that the image on the spherical surface E' is imaged with favorable optical performance on the planar screen (effective projection region) E. In addition, since the optical system R including the plurality of curved reflective surfaces R1, R2, R3 and R4 as structural elements is used, it becomes possible to project an image obliquely onto the screen E due to the characteristics of an off-axial optical system.

Therefore, the image of the image display panel LV is projected and displayed at a region B2 of the screen E, after passing through the optical system C, the rotatable mirror G and the optical system R. Here, if the rotatable mirror G rotates as described above, the images of the regions A1, B1 and C1 on the spherical surface E' are respectively imaged onto regions A2, B2 and C2 on the planar screen E. As a result, according to the projection optical system of the present invention, it becomes possible to display an image at any projection angle within the region (effective projection region) E where favorable optical performance is ensured by the optical system R. However, the member rotating around the exit pupil EXP of the optical system C on the image display panel LV side is not limited to the rotatable mirror G. In the present invention, the optical system C, the optical system R, and the image display panel system LL may rotate together, or the optical system R on the image side may be rotated. These are relative rotations of the respective members, so that rotations of any of the members including the above-mentioned optical systems are optically equivalent.

In addition, an image of the region B1 on the spherical surface E' is not necessarily imaged onto a spherical surface. That is to say, a projected surface does not have to form the spherical surface E'. In other words, as can be seen from the above-mentioned principle, in order to vary the projection angle, the projected image by the optical system C on the panel side has to be continuously moved on the projected surface while maintaining favorable optical performance. This is best realized by making the projected surface being a spherical surface E'. However, in practice, there is some latitude in the tolerances of the optical performance, such as the depth of focus and distortion of the optical system C. Thus, as long as the tolerances are met, the projected surface may be of any surface shape, and it is not necessarily to be spherical.

In addition, the image-forming process of the optical system C on the side of the image display panel LV will be described. When the projection optical system P of the present invention varies the position of the image display surface S two-dimensionally on the screen E, if the aberrations of the entire field angle in the respective azimuthal directions are produced uniformly, they do not need to be sufficiently corrected. This is because, if the aberrations of the entire field angle are produced uniformly, they can be corrected by the optical system R on the image surface side, which includes curved reflective surfaces as structural elements. Moreover, when the position of the image display surface S is varied one-dimensionally in only a single direction on the screen E, if the aberrations for the entire field angle are produced uniformly only in the variation direction, the image-forming performance in non-variation directions does not need to be favorable. This is also because the aberrations of the entire field angle can be corrected by the optical system R on the image surface side, which includes curved reflective surfaces as structural elements.

Moreover, the above-described principle was described only in the paper plane, but it is the same for three-dimensional space. Meanwhile, a two-dimensional movement of the projected image on the screen E with the rotatable mirrors as the only member G rotating around the exit pupil EXP of the optical system C on the side of the image display panel LV can be easily accomplished using a total of two rotatable mirrors G1 and G2 which are responsible for rotation in the horizontal direction and rotation in the vertical direction. This is because, when the rotatable mirror G in FIG. 10A is rotated in the direction perpendicular to the paper plane, the image display panel LV and the rotatable mirror G of the illumination system LL are in a skewed positional relation, so that even though the reference axis ray on the screen E is imaged onto a desired location, the image display surface S is rotated on the screen E. However, a plurality of rotatable mirrors G1 and G2 can not be physically arranged at the exit pupil EXP of the first optical system C on the image display panel LV side, but, even if the rotatable mirrors G1 and G2 are not precisely arranged at the exit pupil EXP, they may be arranged near the exit pupil EXP at such spacing that they do not interfere with each other, as long as the projected image on the spherical surface E' is within the range of tolerances of optical performance as described above. In addition, needless to say, moving the projected image two-dimensionally on the screen E in such a manner can also be accomplished with a single rotatable mirror which is arranged at the exit pupil EXP of the optical system C on the side of the image display panel LV. This is because it is conceivable that there is a method for rotating the image display panel LV such that the rotation of the image display surface S is canceled, in order to repress the above-described rotation of the image display surface S on the screen E.

Next, even though the projected image is magnified or demagnified on the predetermined image surface E by zooming (variable magnification) of the projection optical system P, the region to be projected (effective projection region) remains constant due to the movement of the projected image. This will be explained with reference to FIG. 10B.

Figure 10B:
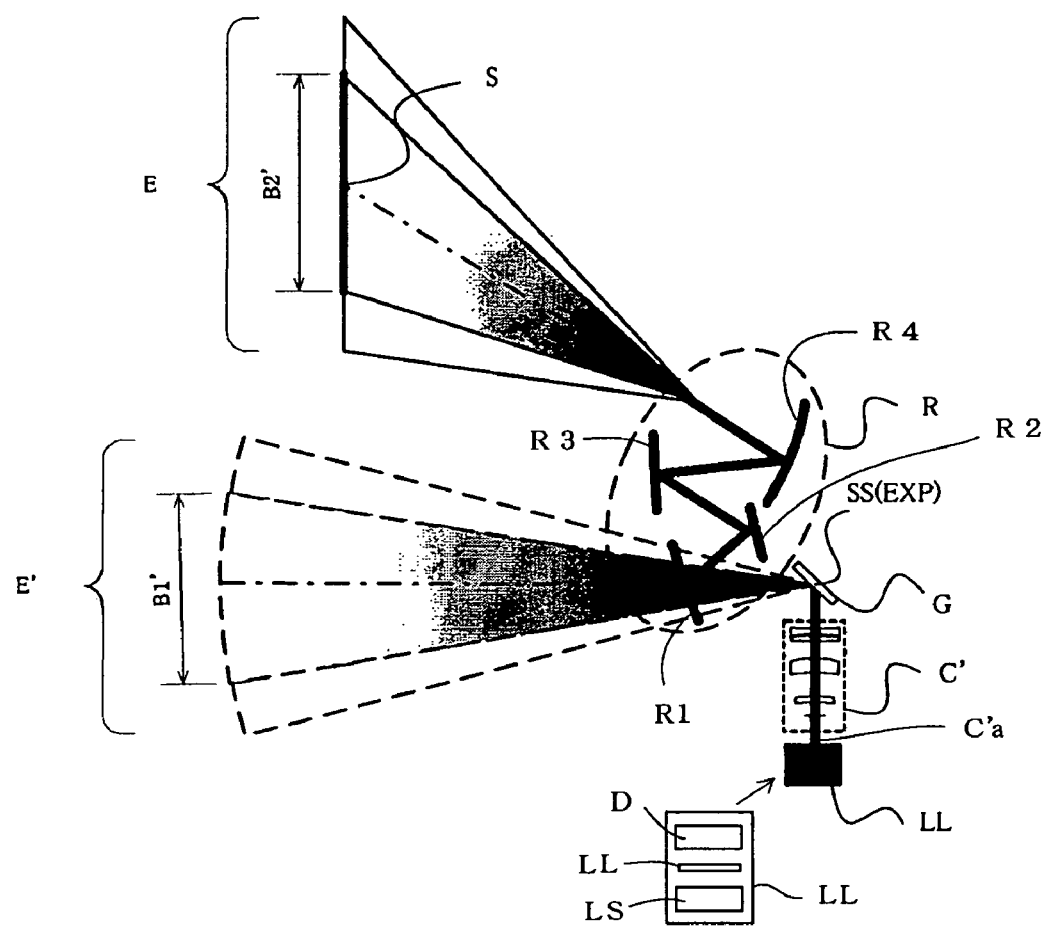
FIG. 10B shows a diagram illustrating the principle for varying the projection angle in the present invention.

In FIG. 10B, the same notations represent the same elements as those of FIG. 10A which shows the above-mentioned principle for varying the projection angle. In addition to the above-mentioned principle for varying the projection angle, an optical system C' on the object surface side has a zoom function. The method of zooming is generally performed by shifting lenses in the optical axis direction of an optical system having, for example, conventional coaxial lenses.

Moreover, in FIG. 10B, the optical system C' zooms at a wide field angle as compared with the optical system C of FIG. 10A, which is referred to explaining the variation of the projection angle. In this situation, similarly, the optical system C' forms a substantially spherical image like a region B1' on the spherical surface E'. The condition imposed in the optical system C' during zooming is that the curvature of the region B1' is substantially constant even after zooming and that the position of the exit pupil EXP, that is, the distance from the image display panel LV to the exit pupil EXP and the distance from the exit pupil EXP to the region B1', is approximately constant. Keeping the distance from the image display panel LV to the exit pupil EXP and the distance from the exit pupil EXP to the region B1' constant gives an advantage that the position of the rotatable mirror G can be fixed in the vicinity of the position of the exit pupil EXP, similarly to the above-mentioned principle. When the image of the region B1' moves on the spherical surface E' by rotating the rotatable mirror G, if aberrations of the entire field angle in respective azimuth directions are uniform, the aberrations do not necessarily need to be sufficiently corrected, similarly to the above-mentioned reason. With regard to the amounts of the aberrations, if the aberrations of the entire field angle in respective azimuth directions are uniform even during zooming and if the amounts of the aberrations are within the range of the tolerance even after the zooming, they do not necessarily have to be sufficiently corrected. In this situation, similarly to the above-described explanation, the optical system R on the image surface side is designed such that the projected image on the spherical surface E' is formed with favorable optical performance. Thus, if the movement range of the image on the region B1' is set to the spherical surface E', it is possible to keep the region (effective projection region) E to be projected by the zoom to be constant. Therefore, even when the image display surface S on the screen E is reduced at the telephoto side with the projection optical system P, it is possible to increase the movement amount of the image display surface S accordingly. Further, the projection angle is rather increased, and thus it is possible to enhance the degree of freedom for setup positions of the projection type image display apparatus without compromising.

Moreover, in the present specification, it is described that the position of the exit pupil EXP is constant even after the zoom. However, the movement amount of the exit pupil during the zoom is equal to or less than the radius of the aperture of the stop SS (more preferably, one fifth or less of that radius), or equal to or less than the radius or the longest radius at the exit pupil surface of light flux to be emitted from the optical system C (more preferably, one fifth or less of that radius).

EMBODIMENT 1

Figure 14A:
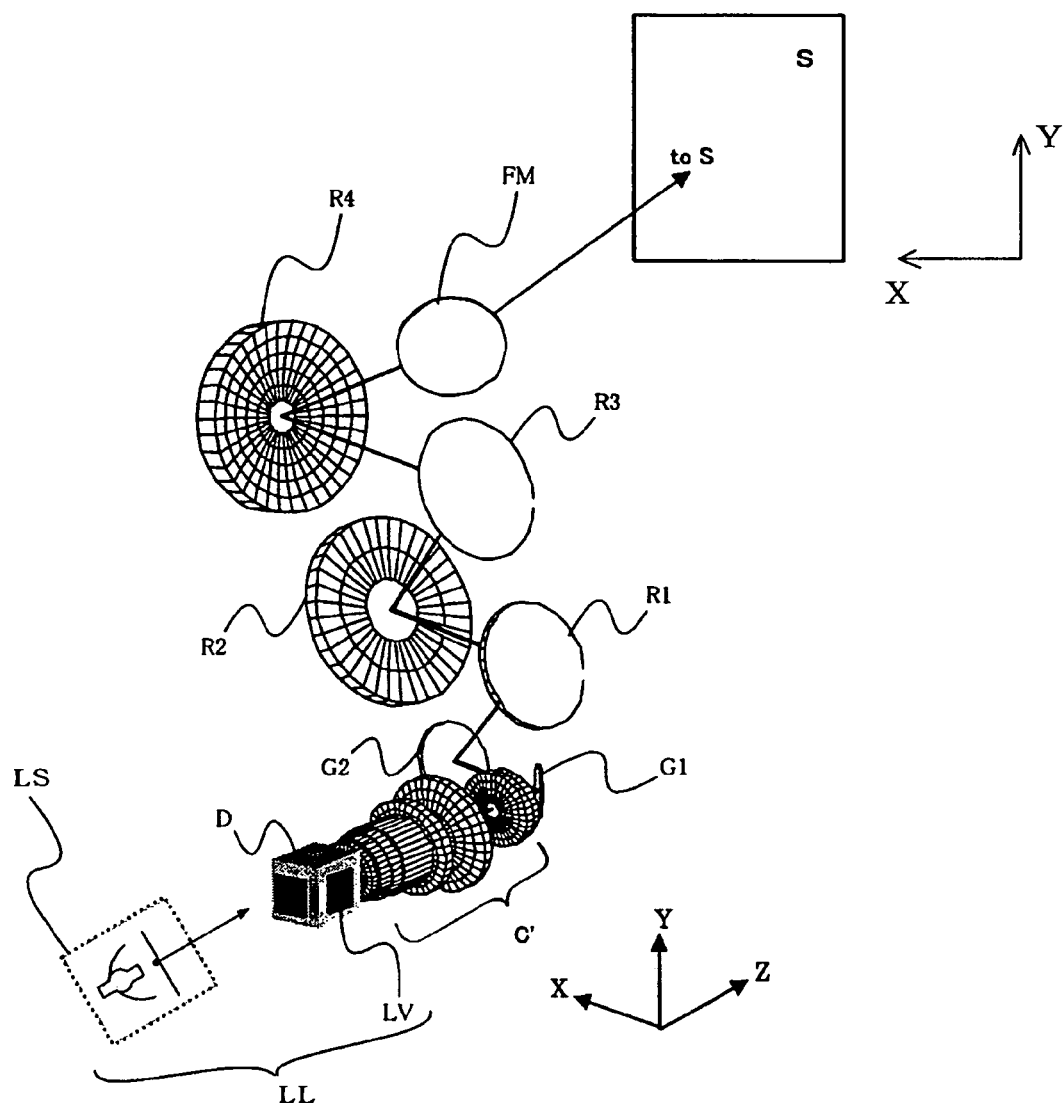
FIG. 14A shows a diagram illustrating the spatial surface arrangement of Embodiment 1 of the present invention.

In the projection optical system P of the present invention, the arrangement of the respective optical surfaces will now be described with reference to FIG. 14A. In FIG. 14A, the notations LL, C', R and G represent the same elements as those in the above-described explanation. Two rotatable mirrors G1 and G2 are provided in the vicinity of the exit pupil of the coaxial optical system (optical system) C and have rotation axes in different directions each other (orthogonal directions). In the case of FIG. 14A, the rotatable mirror G1 is responsible for changing of the projection angle in the horizontal direction, and the rotatable mirror G2 is responsible for changing of the projection angle in the vertical direction. Moreover, a planar folded mirror FM which is a final reflective surface of FIG. 14A is inserted to bend the projection direction by 90°.

Figure 14B:
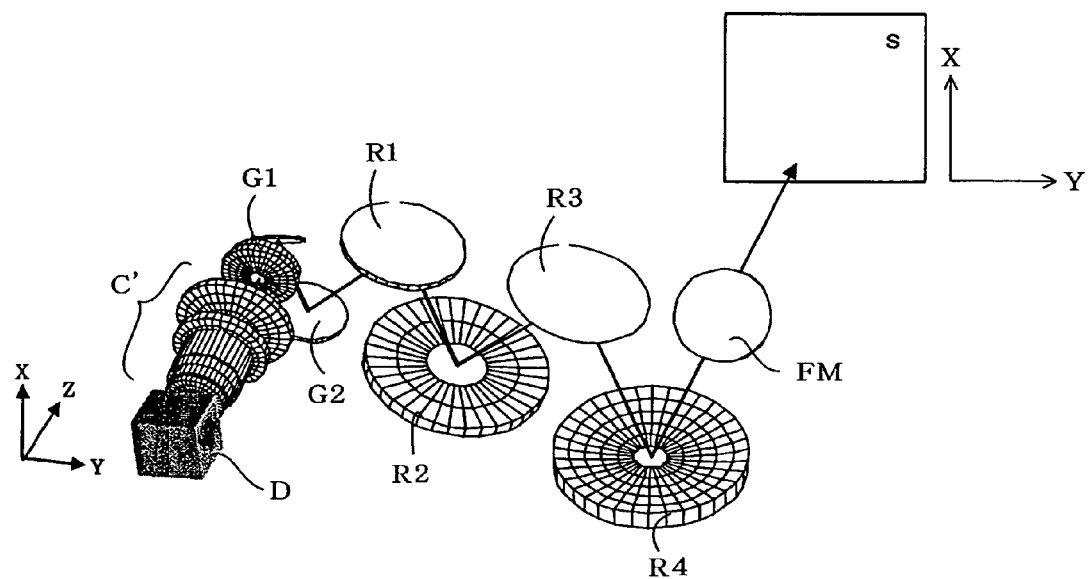
FIG. 14B shows a diagram illustrating the spatial surface arrangement of Embodiment 1 of the present invention.

Moreover, regarding methods for setting up the projection optical system and the projection type image display apparatus using the projection optical system of the present embodiment, an example is shown in FIG. 14B. In FIG. 14B, the entire optical system is rotated by 90° with respect to the optical axis of the coaxial system (the central normal of the image display panel surface LV) as compared with the structure shown in FIG. 14A. An aspect ratio of the image display panel is inverted in advance in FIG. 14A, on the assumption that it is used as shown in FIG. 14B, so that it is not specifically problematic. This is intended to make visual understandings easy regarding light path diagrams or the like in the embodiments with numerical examples (TABLE 1) described below, without influencing the nature of the present invention. Therefore, only FIGS. 1 (the position of the image surface) and 7 (distortion) are shown in the orientation of FIG. 14B, and other drawings such as light path diagrams and aberration diagrams are shown in the orientation of FIG. 14A. However, in the respective drawings, the coordinate axes are shown.

Figure 1:
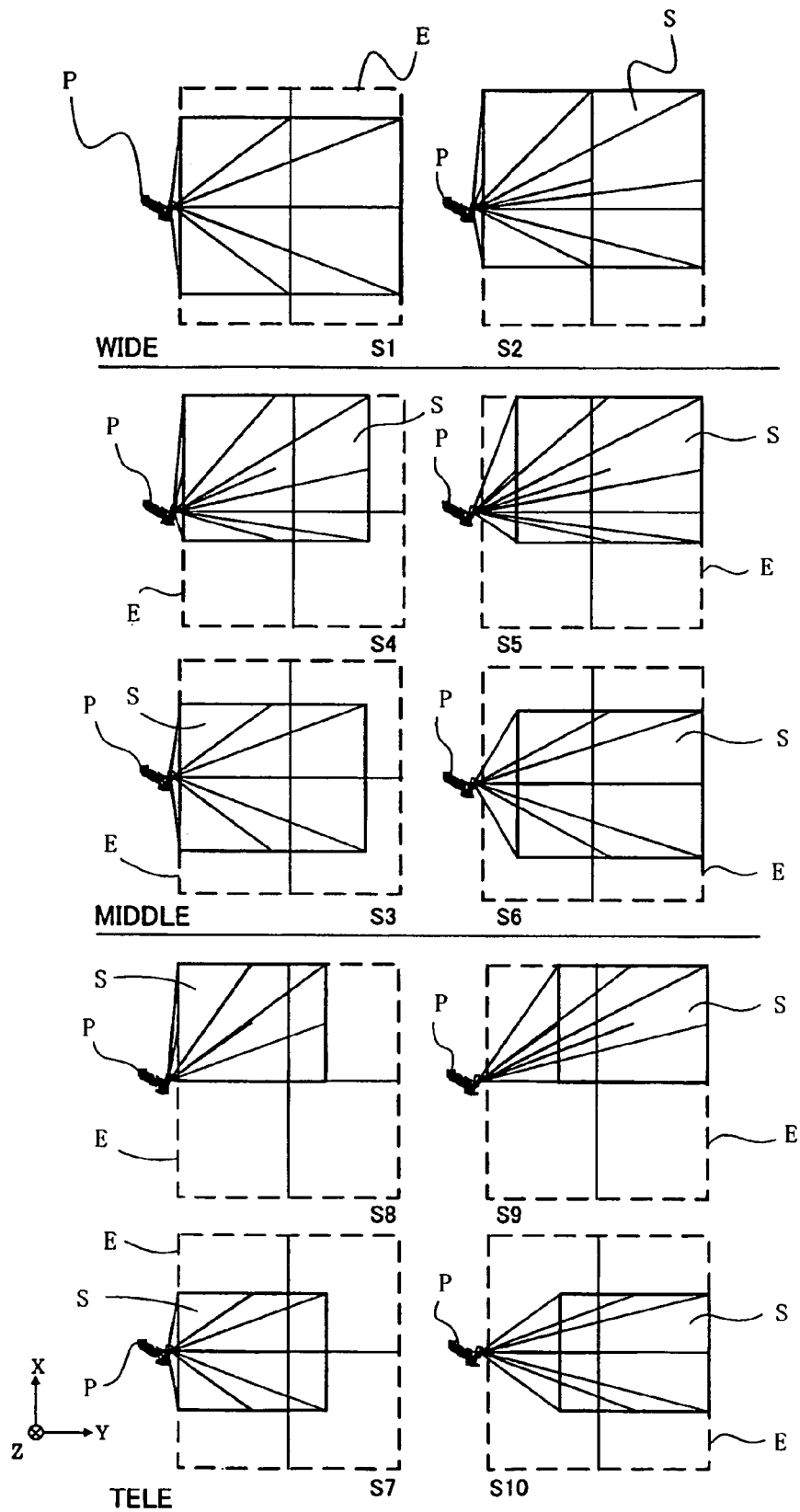
FIG. 1 shows diagrams illustrating constant effective projection regions of a projection type image display apparatus using a projection optical system according to Embodiment 1 of the present invention.

FIG. 1 shows movements of the projected image and zooms of the projected image sizes in the effective projection region (screen) E according to Embodiment 1 of the present invention. In FIG. 1, P denotes the projection optical system or the projection type image display apparatus of the present invention, E denotes the effective projection region, and S denotes the image display surface (image surface). Further, S1 to S10 denote the relationships of the effective projection region E and the image display surface S. Moreover, in a wide angle end (WIDE), a middle zoom position (MIDDLE) and a telephoto end (TELE), the representative positions of the image display surface S are shown. Needless to say, however, if the image display surface S is within the effective projection region E, it can be continuously moved. As can be seen from the drawings, even when the size of the projected image (image display surface) S is magnified or demagnified by the zoom, it can be understood that the effective projection region is constant.

Figure 2:
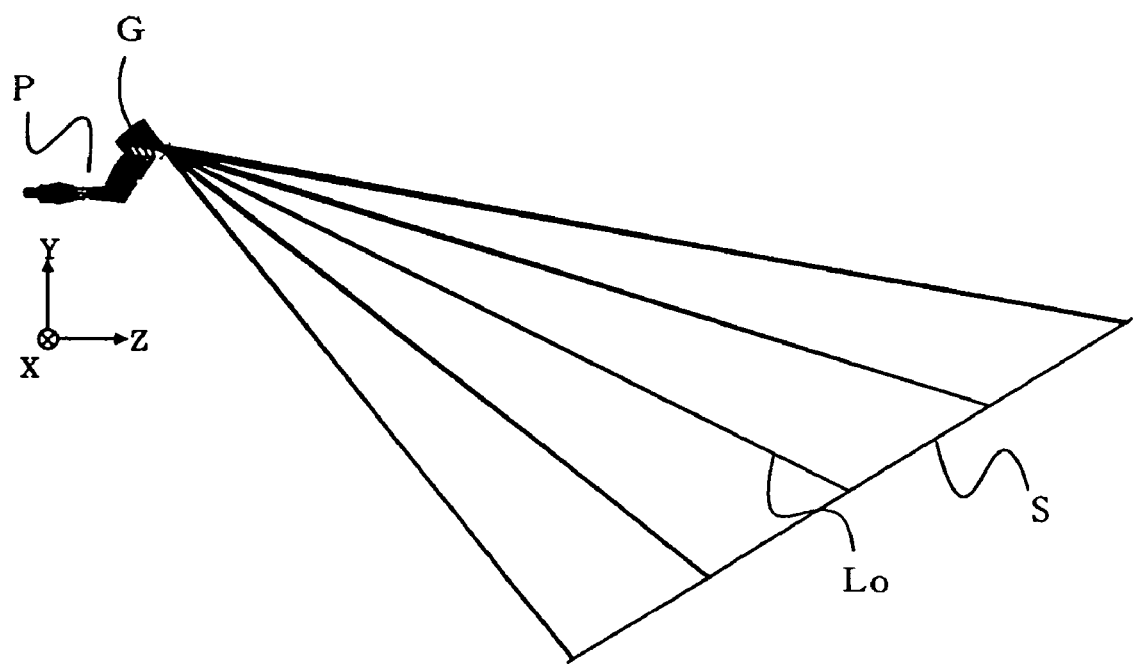
FIG. 2 shows a diagram of the projection optical system according to Embodiment 1 of the present invention.

Moreover, FIG. 2 is a diagram in which a light path, when the reference axis Lo bent by the rotatable mirror G in the projection type image display apparatus P reaches the screen S, is expanded. The coaxial optical system, which is the optical system C on the object surface side of the projection optical system or the projection type image display apparatus P, is shown in FIGS. 3 and 4, and the off-axial reflective optical system R, which is the optical system R on the image surface, is shown in FIG. 5.

Figure 3:
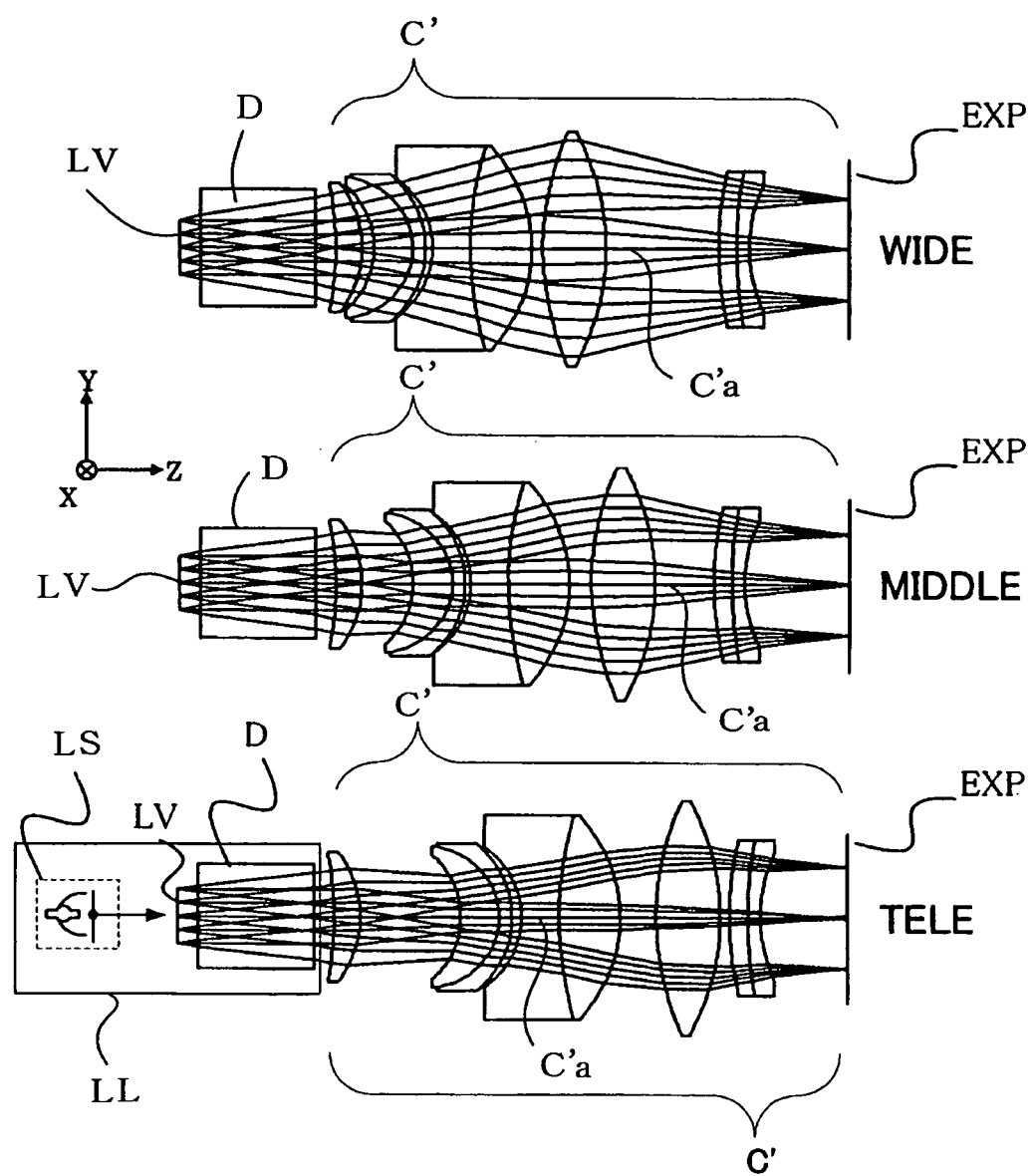
FIG. 3 shows diagrams illustrating the zoom in the optical system of an object surface side according to Embodiment 1 of the present invention.
Figure 4:
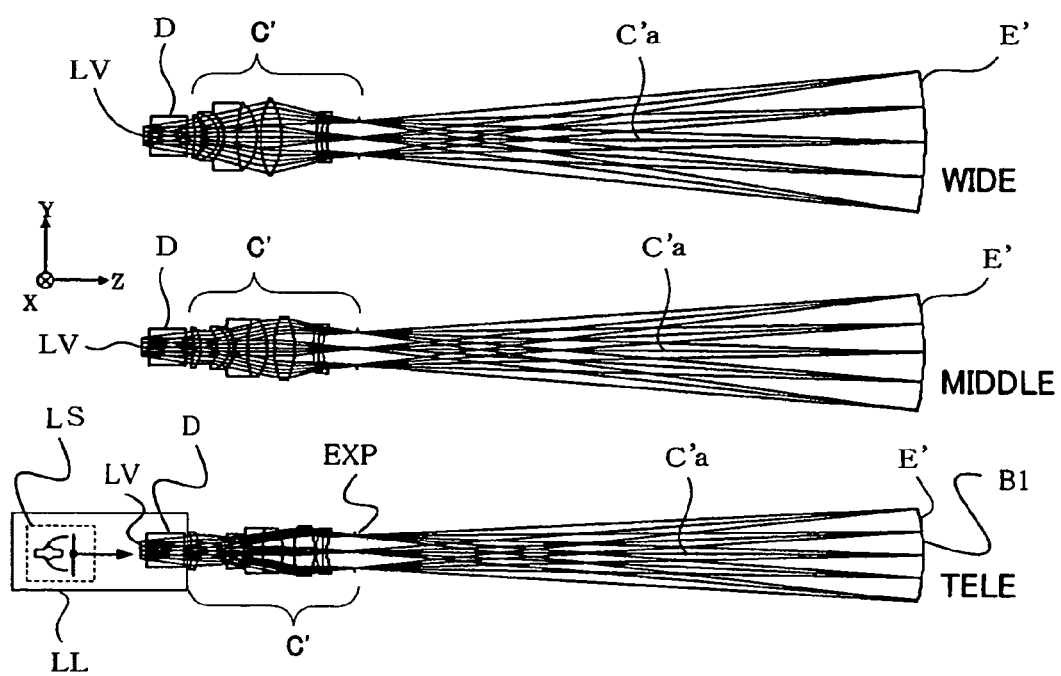
FIG. 4 shows diagrams illustrating the zoom in the optical system of the object surface side according to Embodiment 1 of the present invention.

In FIG. 3, although not shown in detail, L denotes an illumination system which illuminates light onto light valves, and the illumination system comprises a lamp, a condenser lens, a filter which selects wavelengths and so on. Moreover, LV denotes the light valve using a liquid crystal (image display panel), D denotes a dichroic optical element which performs color combination corresponding to the three-panel light valve LV, and C' denotes the axisymmetric coaxial lenses having a zoom function, which is comprised of zoom lenses. In FIG. 3, simplified light path diagrams of only a single-panel light valve are shown. The respective lenses move along the optical axis, such that the zoom (variable magnification) is performed. In this situation, it is understood that the position of the exit pupil EXP is substantially fixed in the optical axis direction. Moreover, FIG. 4 shows that the coaxial optical system C' projects and performs image formation of image information of the light valve LV onto the spherical surface E'. In FIG. 4, B1 is a region of the image display surface to be projected in the coaxial optical system C', and it is understood that the zoom is performed in a state in which the image is formed onto the spherical surface E'.

Figure 5:
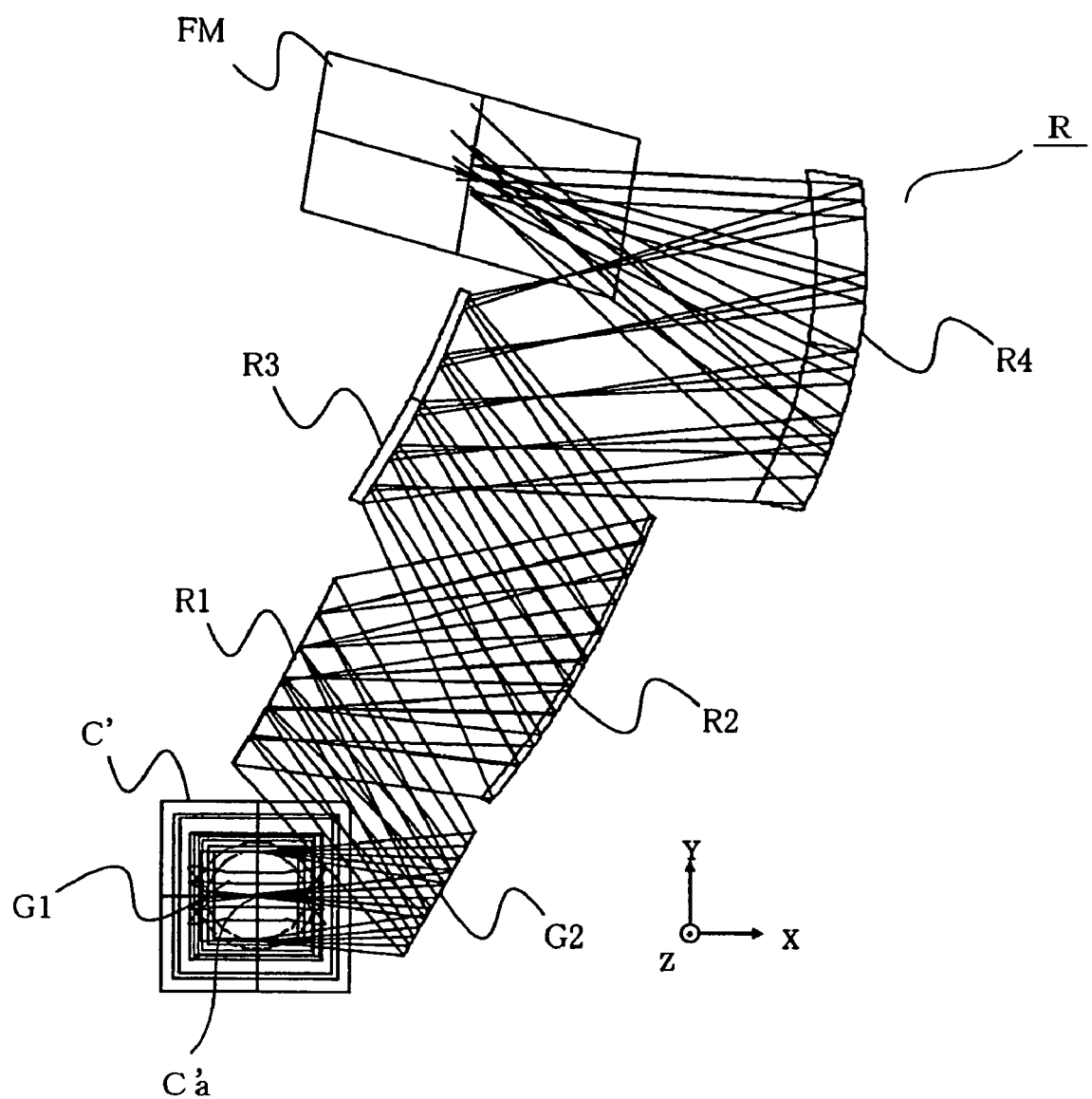
FIG. 5 shows a structural diagram of the optical system of an image surface side according to Embodiment 1 of the present invention.
Figure 6B:
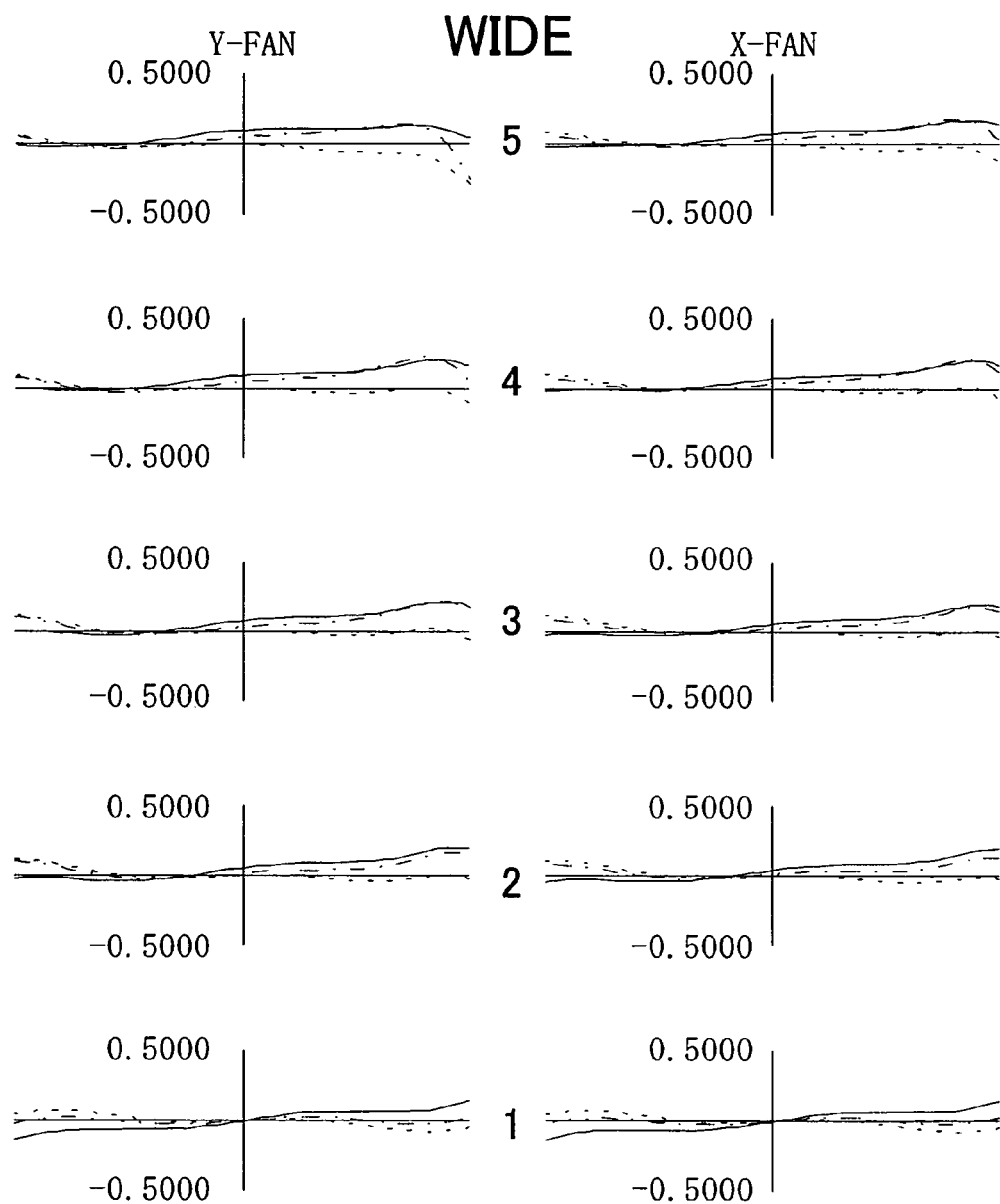
Figure 6C:
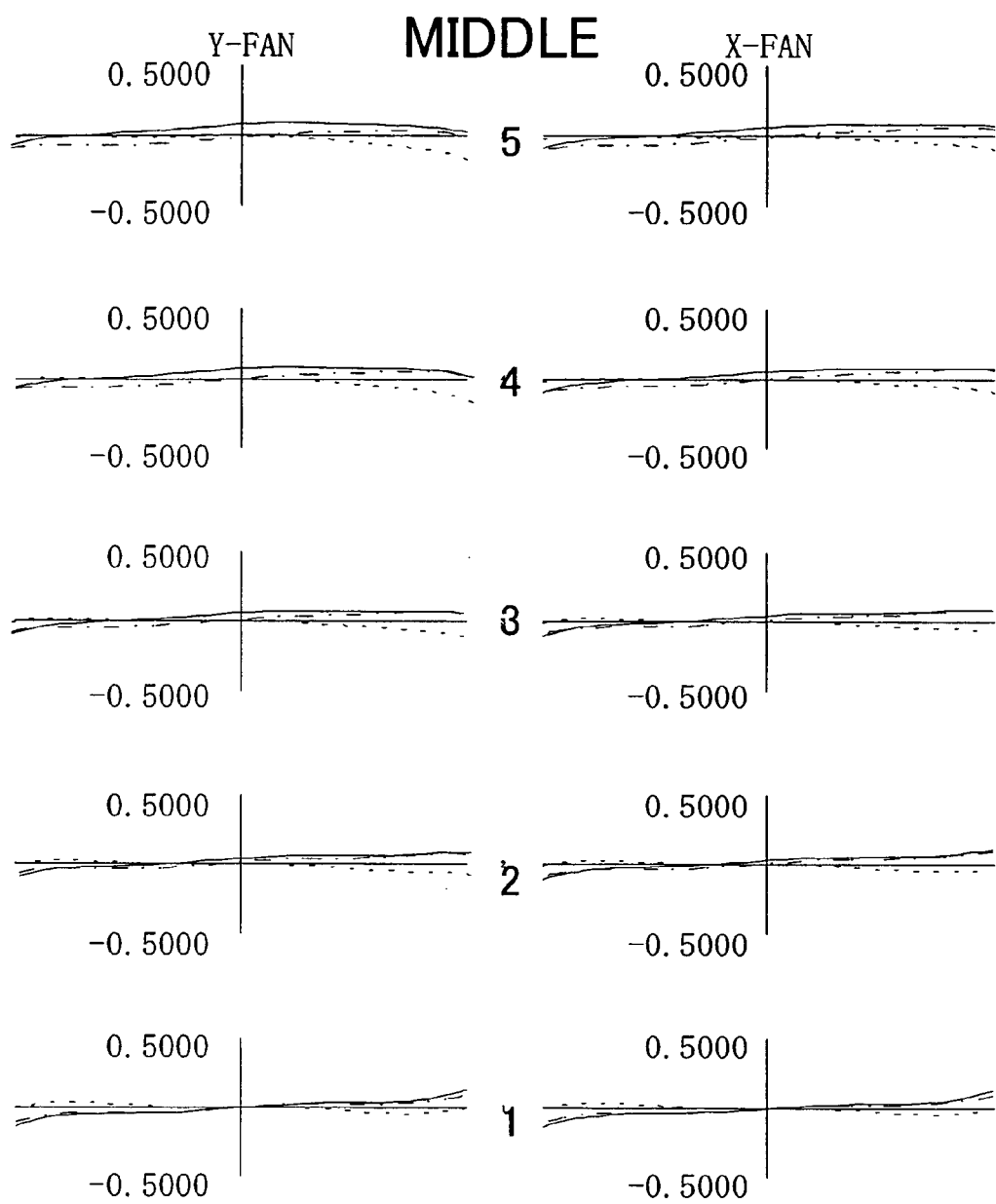
Figure 6D:
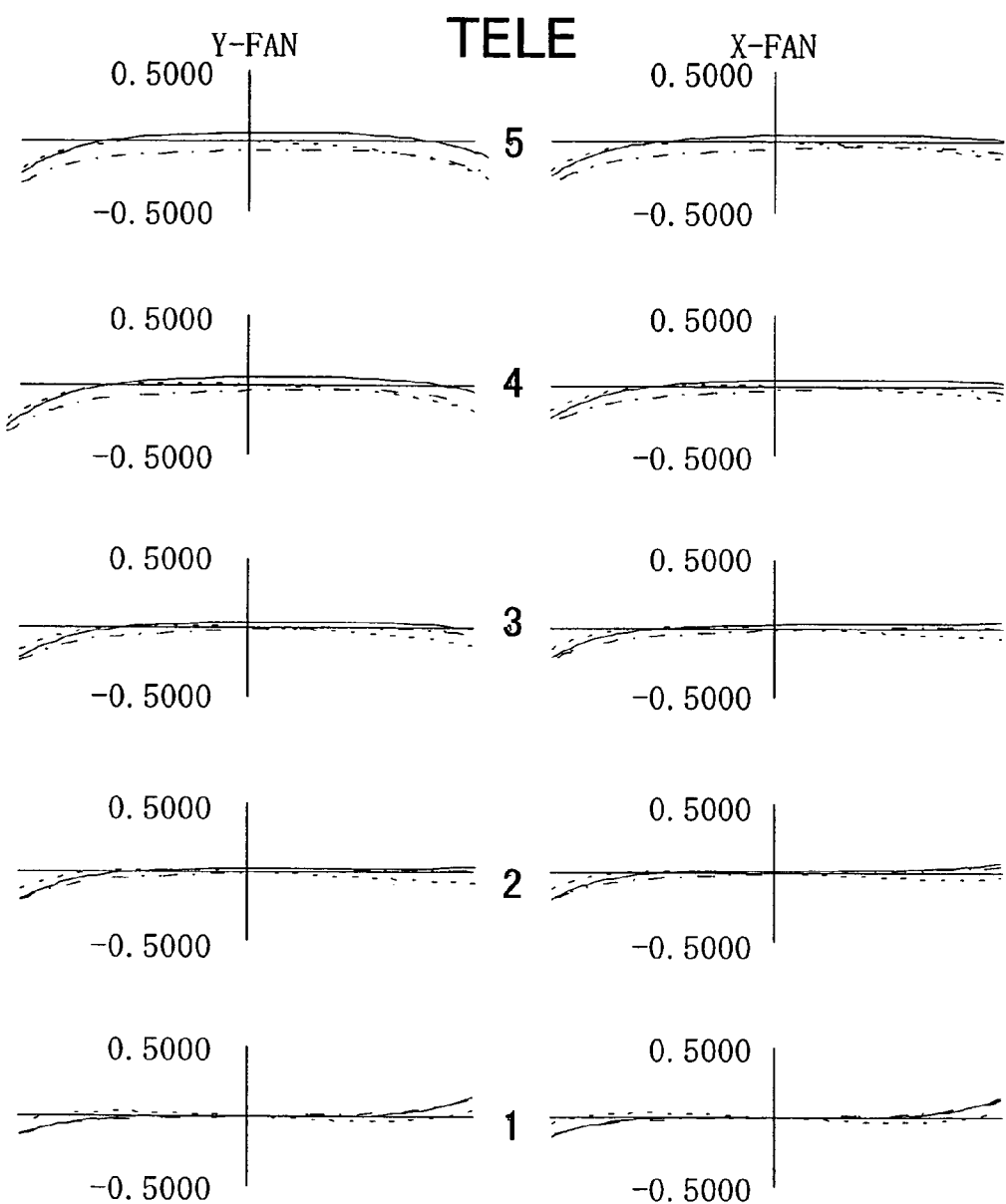

FIG. 5 is a diagram of the projection optical system P as seen from the optical axis direction of the coaxial optical system C'. In FIG. 5, C' denotes the coaxial optical system, G1 denotes the rotatable mirror which is tilted with an angle of 45° to the optical axis C'a. In FIG. 5, the light ray is bent by 90° in the horizontal direction. If the direction of the rotatable mirror G is changed by the rotation, the image display surface S moves within the effective projection region E in the horizontal direction. G2 denotes the rotatable mirror which is to move the image surface in another direction. If the direction of the rotatable mirror G2 is changed by the rotation, the image display surface S moves within the effective projection region E in the vertical direction. The image display surface S can be moved two-dimensionally inside the effective projection area E by using these two mirrors G1 and G2. Moreover, R1 to R4 are the reflective surfaces which constitute the reflective optical system R comprising off-axial reflective surfaces. The reflective optical system R is the projection optical system which guides the light ray emitted from the coaxial optical system C' and uses the off-axial system for forming the projected image onto the image display surface S of the surface of the screen E. FM denotes the planar mirror tilted with an angle of 45° in the horizontal direction with respect to the screen, which bends the projection direction by 90°. In the present embodiment, the panel surface (the surface of the light valve LV) and the image display surface S are arranged to be parallel by the bend of the planar mirror FM. However, this is just an example of the optical system layout, and is not intended to limit the present invention. Moreover, regarding focusing, the optical system C' on the object surface side may be moved along the optical axis C'a of the same optical system. Further, the floating method may be used in which a partial group of lenses in the optical system C' are moved.

In the present embodiment, let the rotation amount of the above-mentioned rotatable member in the horizontal or vertical direction r at the zoom ratio z of the above-mentioned zoom portion be $\theta_{Mr,z}$, the maximum half field angle at the exit side of the optical system C on the object surface side be $\omega_{r,z}$, one half of the image surface size of the image display surface of the effective projection region be $L_{r,z}$, and the movement amount of the image display surface be $S_{r,z}$. Then, the following expression is satisfied:

$$|\omega_{r,z} \cdot S_{r,z}/(M \cdot \theta_{Mr,z} \cdot L_{r,z})|-1|<0.2 \quad (1),$$

where M is a parameter depending on the corresponding member: when the corresponding member is the optical system C disposed on the object surface side or the optical system R disposed on the image surface side, M is 1, and when the corresponding member is a planar mirror, M is 2. The result of Expression (1) in the present embodiment is shown in TABLE 1. Calculated results are shown for every movement direction (x or y) on the image display surface in the respective zoom positions (WIDE, MIDDLE and TELE). In TABLE 1, the units of ω and θ are in degrees, the units of S and L are in mm, and M and the result of Expression (1) are dimensionless numbers. Moreover, in the present embodiment, since the image surface movement in the x direction at the zoom position of WIDE is not present, the calculation result of Expression (1) is blank, but it is just an example and it is not intended to limit the present invention.

Moreover, the size of the light valve which is used in the present embodiment is 0.7 inches with an aspect ratio 4:3 (14.224 mm×10.668 mm), and the size of the effective projection region is 1828.8 mm×1828.8 mm. Further, the size of the image display surface S is 60 inches with an aspect ratio 4:3 (1219.2 mm×914.4 mm) at the zoom position of the telephoto end and 90 inches (1828.8 mm×1371.6 mm) at the zoom position of the wide angle end.

TABLE 1

| ZOOM POSITION z | MOVEMENT DIRECTION r | HALF FIELD ANGLE $\omega_{r,z}$ | MOVEMENT AMOUNT $S_{r,z}$ | HALF IMAGE SURFACE SIZE $L_{r,z}$ | ROTATION AMOUNT $M \cdot \theta_{Mr,z}$ | VALUE OF EXPRESSION (1) |
|---|---|---|---|---|---|---|
| WIDE | y | 5.722 | 229.872 | 687.286 | 1.936 | 0.011 |
| WIDE | x | 7.592 | 0 | 905.017 | 0.000 | |
| MIDDLE | y | 4.779 | 344.306 | 570.548 | 2.905 | 0.007 |
| MIDDLE | x | 6.365 | 153.014 | 752.240 | 1.469 | 0.119 |
| TELE | y | 3.818 | 458.089 | 453.985 | 3.870 | 0.004 |
| TELE | x | 5.107 | 306.217 | 599.697 | 2.931 | 0.110 |

Hereinafter, the structural data of the reflective optical system P used in the present embodiment are shown in TABLES 2, 3, and 4.

The surface numbers are counted in the order from the side of the light valve LV to the side of the screen E.

The surface numbers 1 and 2 denote dichroic optical elements, the surface numbers 3 to 15 denote lens surfaces of the optical system C', the surface numbers 16 and 17 denote the rotatable mirrors G1 and G2, the surface numbers 18 to 21 denote the reflective surfaces R1 to R4 of the optical system R, the surface number 22 denotes the folded mirror FM, and the surface number 23 denotes the screen surface (image display surface).

Ndi and νdi denote the refractive index and the Abbe constant of the medium between the i-th medium and the (i+1)th for the d line.

TABLE 2

| numerical aperture on the object side | | | | wide angle end | | | middle | telephoto end |
|---|---|---|---|---|---|---|---|---|
| | | | | 0.25 | | | 0.21 | 0.17 |
| surf. | Xi | Yi | Zi | Di | θxb, i | θyb, i | Ndi | νdi |
| 1 | 0.00 | 0.00 | 0.00 | 28.00 | 0.00 | 0.00 | 1.516330 | 64.14 transmitted surface. |
| 2 | 0.00 | 0.00 | 28.00 | 5.00 | 0.00 | 0.00 | | transmitted surface. |
| 3 | 0.00 | 0.00 | 33.00 | 6.28 | 0.00 | 0.00 | 1.743997 | 44.79 transmitted surface. |
| 4 | 0.00 | 0.00 | 39.28 | 2.98 | 0.00 | 0.00 | | transmitted surface. |
| 5 | 0.00 | 0.00 | 42.25 | 9.33 | 0.00 | 0.00 | 1.743997 | 44.79 transmitted surface. |
| 6 | 0.00 | 0.00 | 51.59 | 3.00 | 0.00 | 0.00 | 1.516330 | 64.14 transmitted surface. |
| 7 | 0.00 | 0.00 | 54.59 | 1.71 | 0.00 | 0.00 | | transmitted surface. |
| 8 | 0.00 | 0.00 | 56.30 | 9.09 | 0.00 | 0.00 | 1.698947 | 30.13 transmitted surface. |
| 9 | 0.00 | 0.00 | 65.39 | 14.75 | 0.00 | 0.00 | 1.487490 | 70.24 transmitted surface. |
| 10 | 0.00 | 0.00 | 80.14 | 2.69 | 0.00 | 0.00 | | transmitted surface. |
| 11 | 0.00 | 0.00 | 82.83 | 15.31 | 0.00 | 0.00 | 1.583126 | 59.37 transmitted surface. |
| 12 | 0.00 | 0.00 | 98.24 | 26.84 | 0.00 | 0.00 | | transmitted surface. |
| 13 | 0.00 | 0.00 | 124.97 | 4.39 | 0.00 | 0.00 | 1.761821 | 26.52 transmitted surface. |
| 14 | 0.00 | 0.00 | 129.36 | 3.00 | 0.00 | 0.00 | 1.517417 | 52.43 transmitted surface. |
| 15 | 0.00 | 0.00 | 132.36 | 23.97 | 0.00 | 0.00 | | transmitted surface. |
| 16 | 0.00 | 0.00 | 156.33 | 50.00 | 0.00 | 45.00 | | rotatable mirror |
| 17 | 50.00 | 0.00 | 156.33 | 77.91 | 28.18 | 0.00 | | rotatable mirror |
| 18 | 6.84 | 64.86 | 156.33 | 85.00 | −30.31 | 0.00 | | reflective surface. |
| 19 | 91.61 | 71.19 | 156.33 | 88.93 | 30.98 | 0.00 | | reflective surface. |
| 20 | 44.06 | 146.34 | 156.33 | 120.80 | −32.00 | 0.00 | | reflective surface. |
| 21 | 164.12 | 159.63 | 156.33 | 120.00 | 17.18 | 0.00 | | reflective surface. |

TABLE 2-continued

| 22 | 58.21 | 216.05 | 156.33 | 2110.00 | −28.00 | 45.00 | | folded mirror |
|----|-------|--------|--------|---------|--------|-------|---|---|
| 23 | 58.96 | 1206.63 | 2019.35 | | 28.00 | 0.00 | | image surface |

TABLE 3 spherical curvature radii

| surface 1 (D1 surface) | planar surface |
|---|---|
| surface 2 (D2 surface) | planar surface |
| surface 3 (C1 surface) | −91.51972 |
| surface 4 (C2 surface) | −29.37358 |
| surface 5 (C3 surface) | −22.50123 |
| surface 6 (C4 surface) | −18.72277 |
| surface 7 (C5 surface) | −26.04898 |
| surface 8 (C6 surface) | −23.27059 |
| surface 9 (C7 surface) | 99.02868 |
| surface 10 (C8 surface) | −40.65154 |
| surface 11 (C9 surface) | 71.45785 |
| surface 12 (C10 surface) | −65.95635 |
| surface 13 (C11 surface) | 91.71364 |
| surface 14 (C12 surface) | 124.73891 |
| surface 15 (C13 surface) | 41.31146 |
| surface 16 (G1 surface) | planar surface |
| surface 17 (G2 surface) | planar surface | aspherical surface coefficients

| surface 11 (R9 surface) | K: 0.379750<br>B: −0.183890E−09<br>D: −0.333502E−15 | A: −0.128354E−05<br>C: 0.724250E−12 |
|---|---|---|
| surface 12 (R10 surface) | K: −0.747343<br>B: 0.411351E−10<br>D: −0.190584E−15 | A: −0.324151E−06<br>C: 0.423451E−12 |
| surface 18 (R1 surface) | C02: 4.7970E−04<br>C04: 1.0135E−07<br>C06: −6.6674E−12<br>C21: −7.3455E−06<br>C23: −2.4699E−09<br>C40: 9.2209E−09<br>C42: 5.9438E−12 | C03: −7.2871E−06<br>C05: −5.4117E−10<br>C20: 1.2077E−04<br>C22: 1.1421E−07<br>C24: 3.0202E−11<br>C41: −1.0265E−09<br>C60: 7.0955E−12 |
| surface 19 (R2 surface) | C02: 1.5548E−03<br>C04: 3.4389E−08<br>C06: −6.4438E−12<br>C21: −8.5818E−06<br>C23: −1.3847E−10<br>C40: 1.0330E−08<br>C42: −4.3200E−12 | C03: −5.5871E−06<br>C05: 2.4114E−10<br>C20: 1.4553E−03<br>C22: 2.4418E−08<br>C24: 3.3396E−12<br>C41: −3.5171E−10<br>C60: −6.5298E−13 |
| surface 20 (R3 surface) | C02: 1.4917E−03<br>C04: 3.0874E−07<br>C06: −2.5752E−10<br>C21: −1.0648E−05<br>C23: 4.1558E−09<br>C40: 1.1785E−07<br>C42: −1.3788E−10 | C03: −5.2922E−06<br>C05: 6.2194E−09<br>C20: 3.2484E−03<br>C22: −2.1189E−07<br>C24: 1.0885E−11<br>C41: 1.3541E−10<br>C60: −1.7447E−10 |
| surface 21 (R4 surface) | C02: 2.8524E−03<br>C04: 2.5662E−08<br>C06: −3.0248E−12<br>C21: 1.7886E−06<br>C23: 1.8465E−10<br>C40: 2.1234E−08<br>C42: 9.9476E−13 | C03: 3.4105E−06<br>C05: 2.0393E−11<br>C20: 2.9404E−03<br>C22: 3.7738E−08<br>C24: 3.5424E−13<br>C41: 1.0256E−10<br>C60: 1.1258E−13 |

TABLE 4 surface spacing of zoom movement Di

| surface | wide angle end | middle | telephoto end |
|---|---|---|---|
| 4 | 2.98 | 12.20 | 24.27 |
| 7 | 1.71 | 1.50 | 2.00 |
| 10 | 2.69 | 5.13 | 8.87 |
| 12 | 26.74 | 14.24 | 1.86 |
| 15 | 23.97 | 25.01 | 21.08 | rotatable members:

surface 16 (G1 surface)

rotation center (Xi, Yi, Zi)=(0.00 0.00 156.33)

θy,i wide angle end: ±0.96779° telephoto end: ±1.93480° surface 17 (G2 surface)

rotation center (Xi, Yi, Zi)=(50.00 0.00 156.33)

θx, i wide angle end: ±0.00000° telephoto end: ±1.46549°

Next, optical actions in the projection optical system P of the present embodiment will be described. Light to be supplied from the light source LS illuminates the light valve LV, and an image at the light valve LV is magnified and projected in the projection optical system P including the coaxial optical system C' and the reflective optical system R in a magnified scale and is displayed on the screen E.

Figure 7:
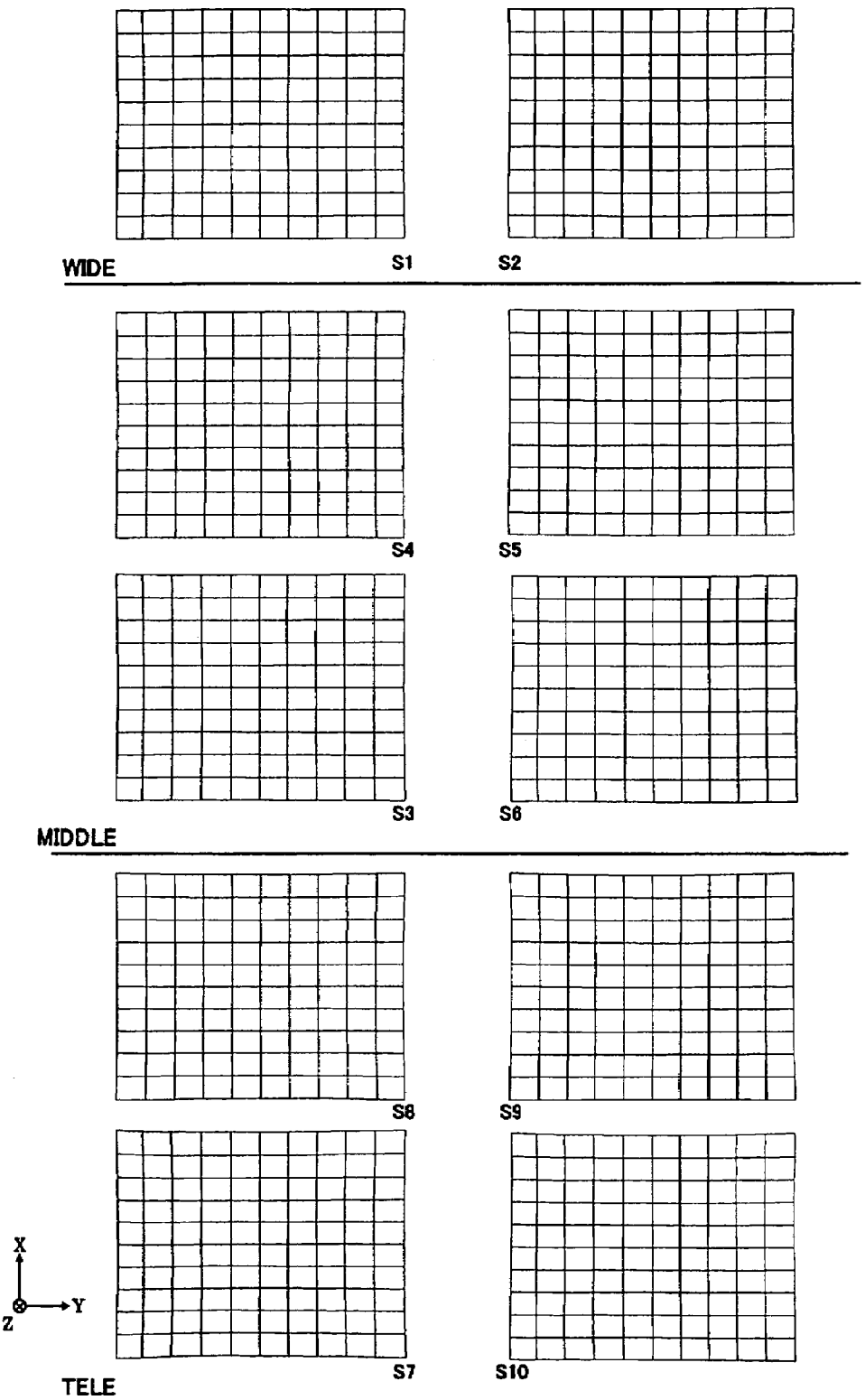
FIG. 7 shows diagrams illustrating the distortion of the projection optical system according to Embodiment 1 of the present invention.
Figure 8A:
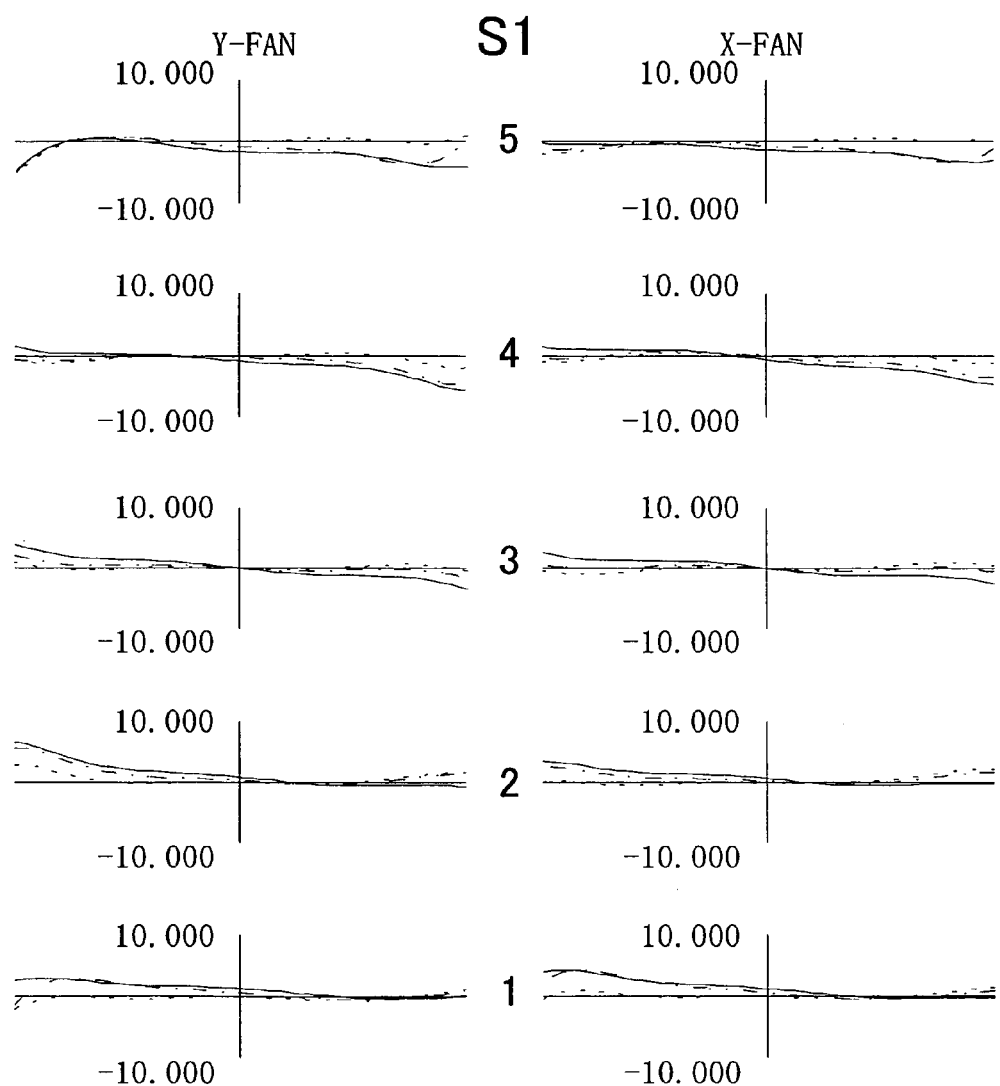
FIGS. 8A to 8J show explanatory diagrams showing lateral aberrations of the projection optical system according to Embodiment 1 of the present invention.
Figure 8B:
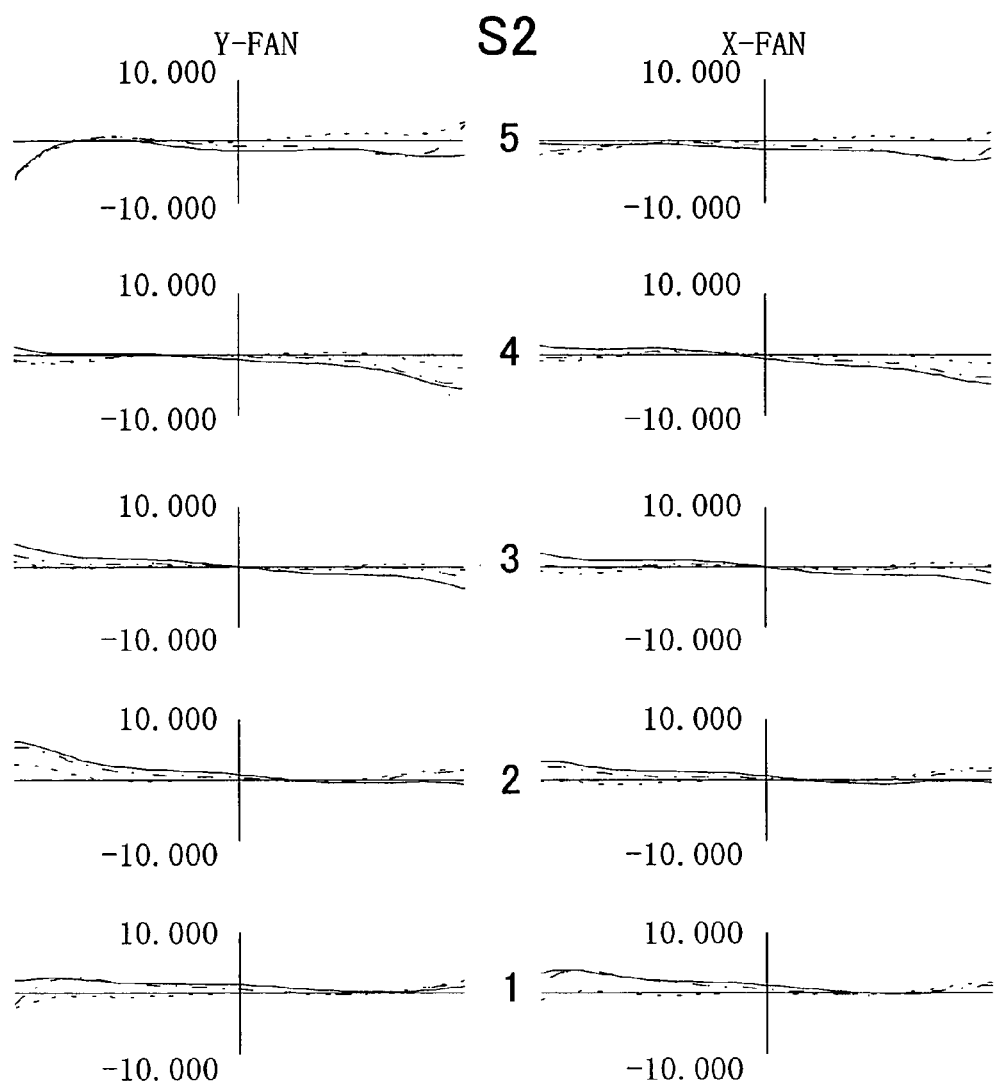
Figure 8C:
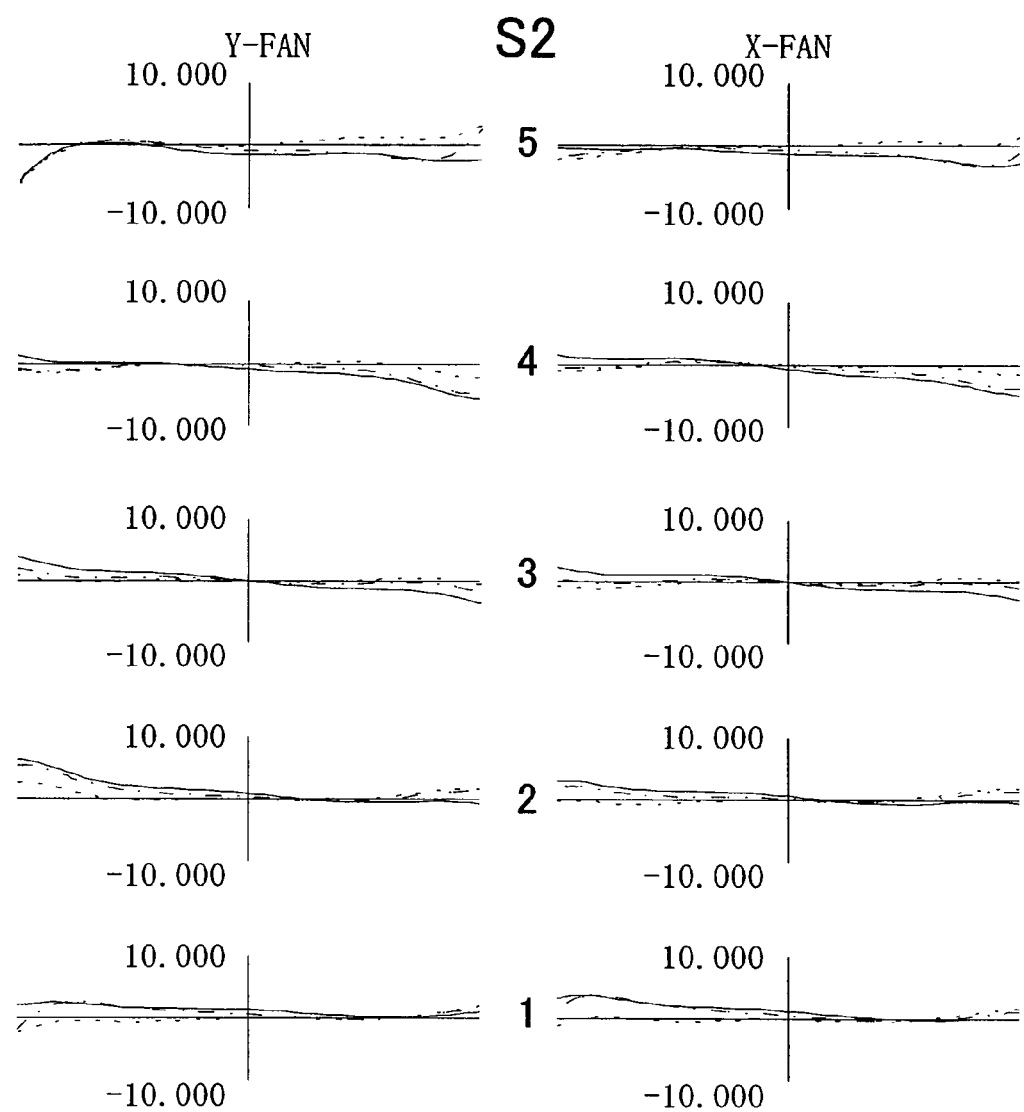
Figure 8D:
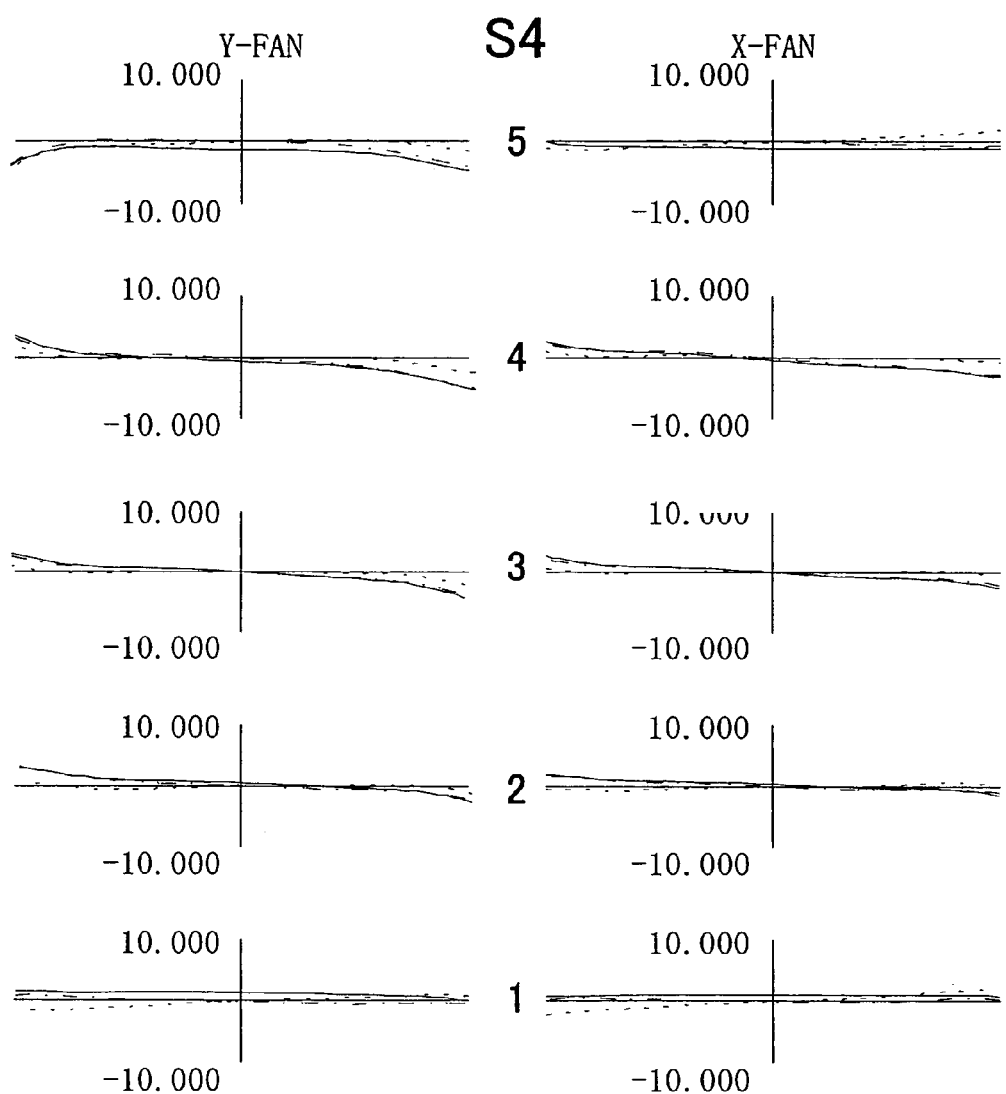
Figure 8E:
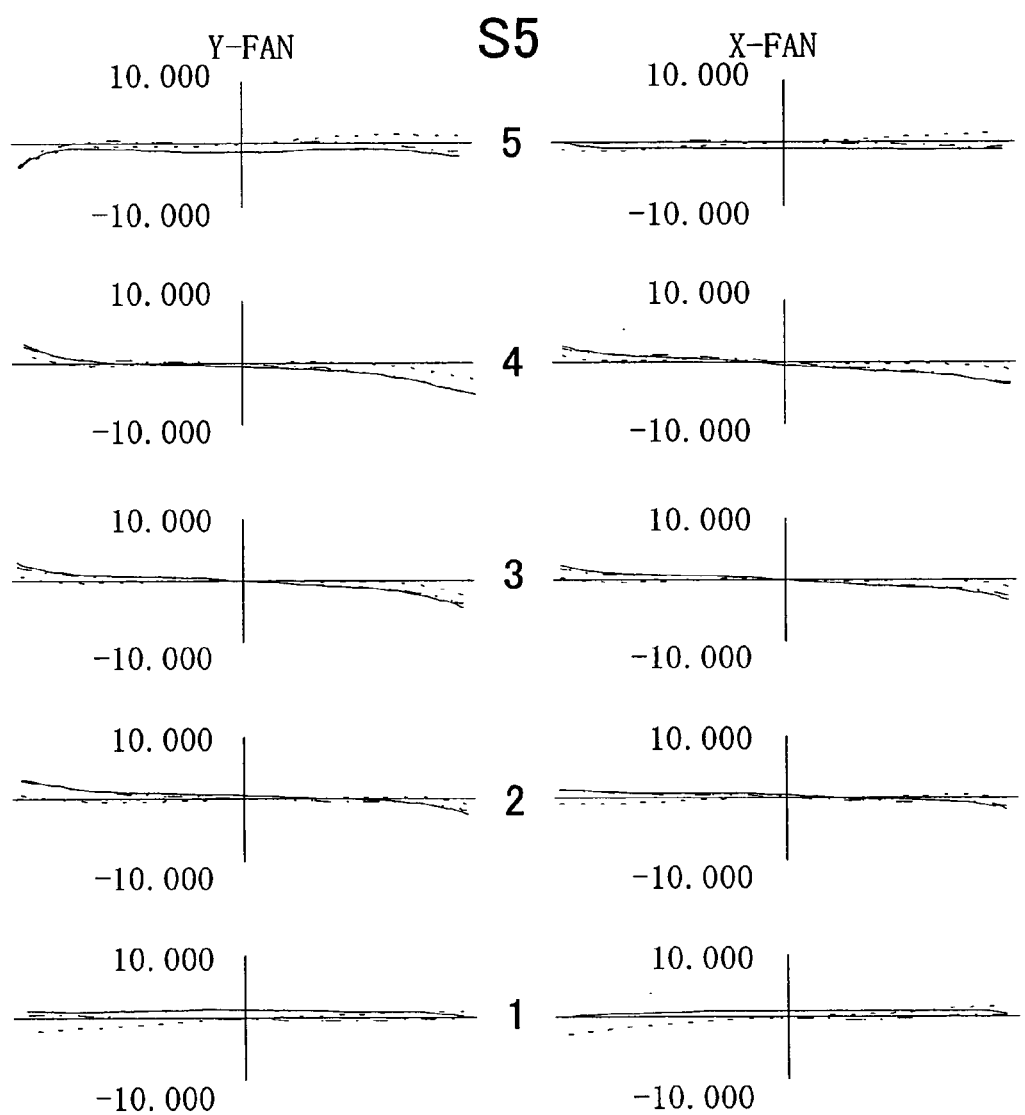
Figure 8F:
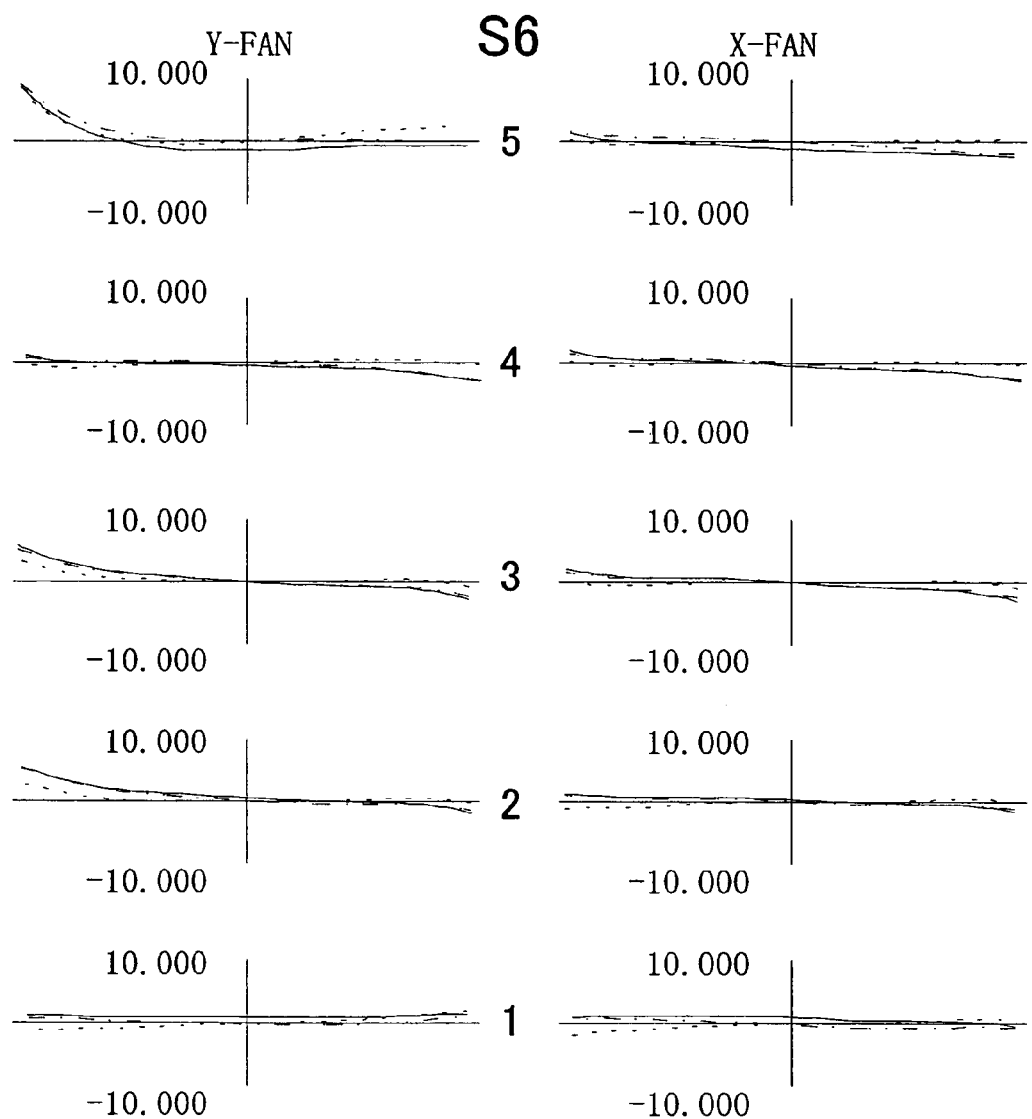
Figure 8G:
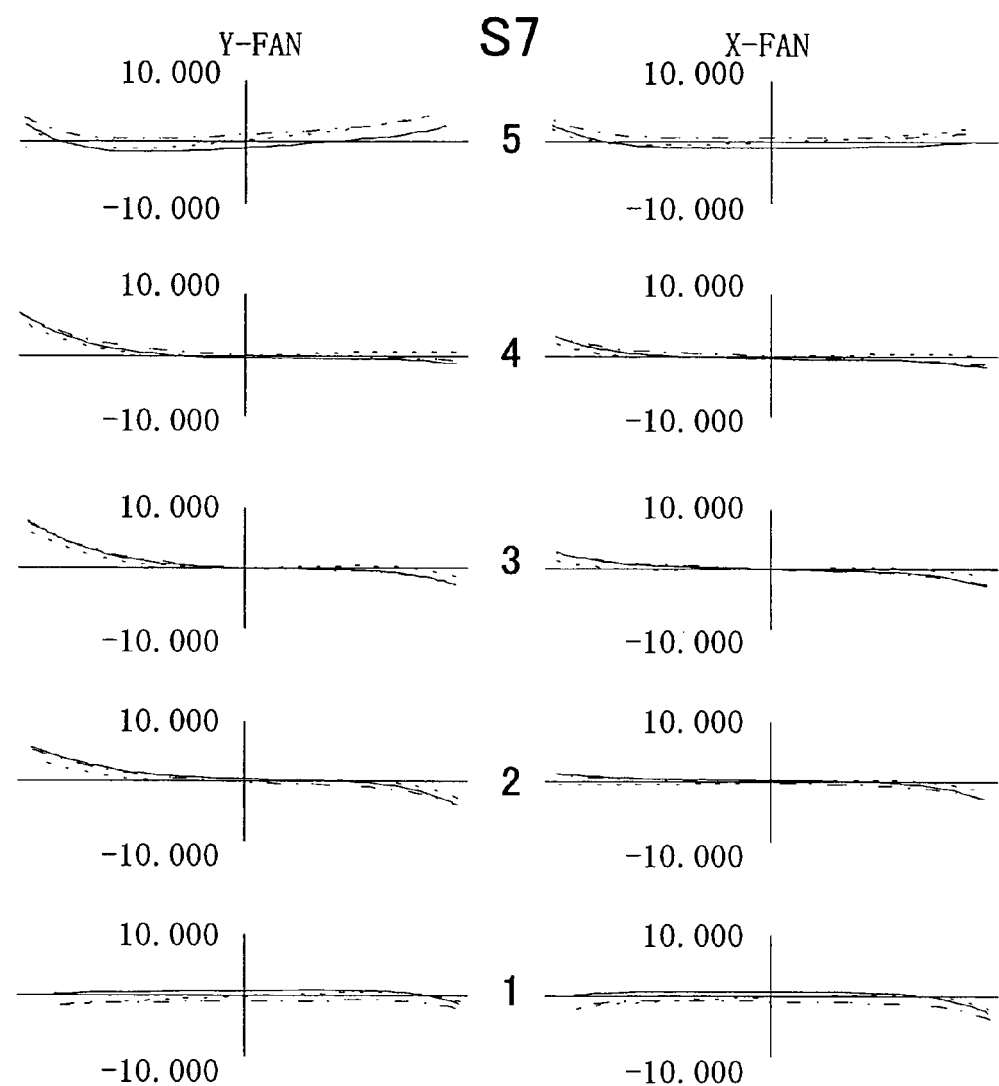
Figure 8H:
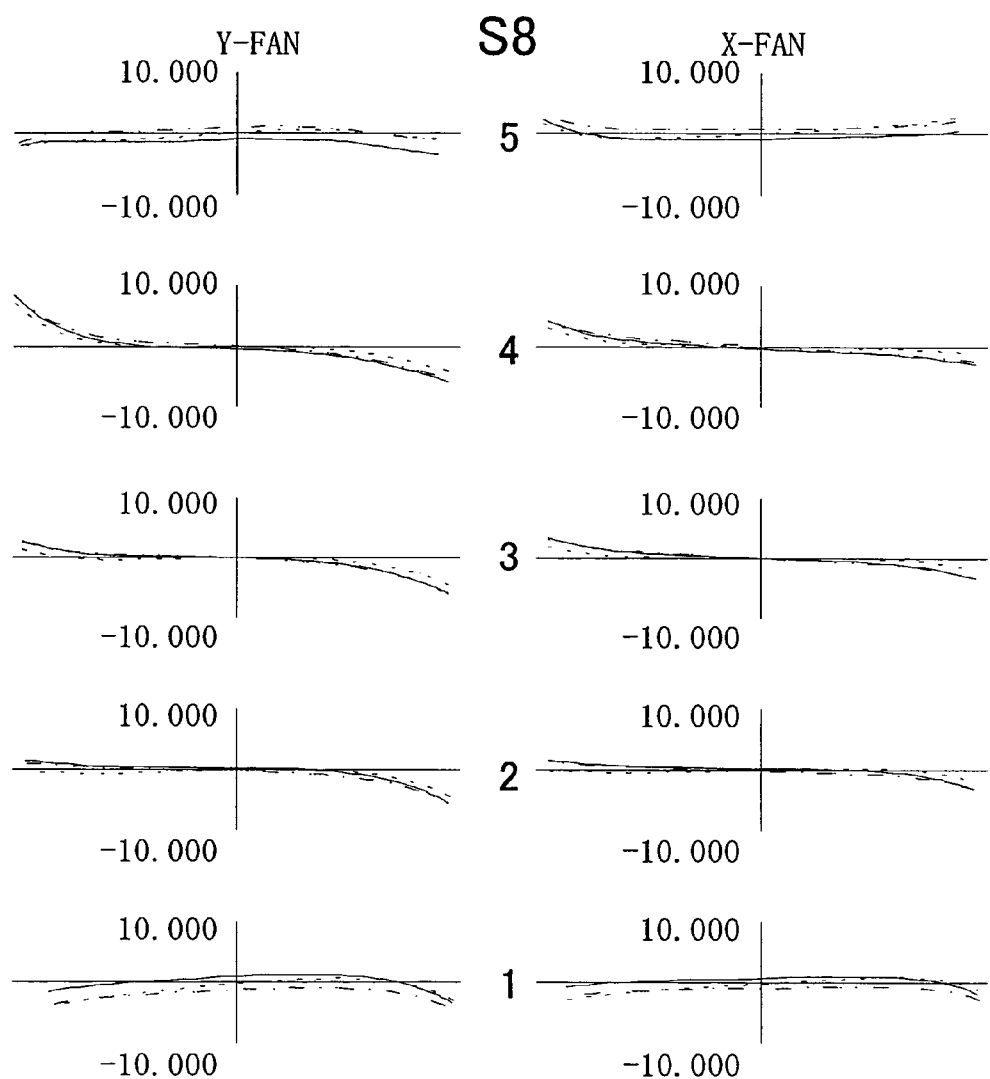
Figure 8I:
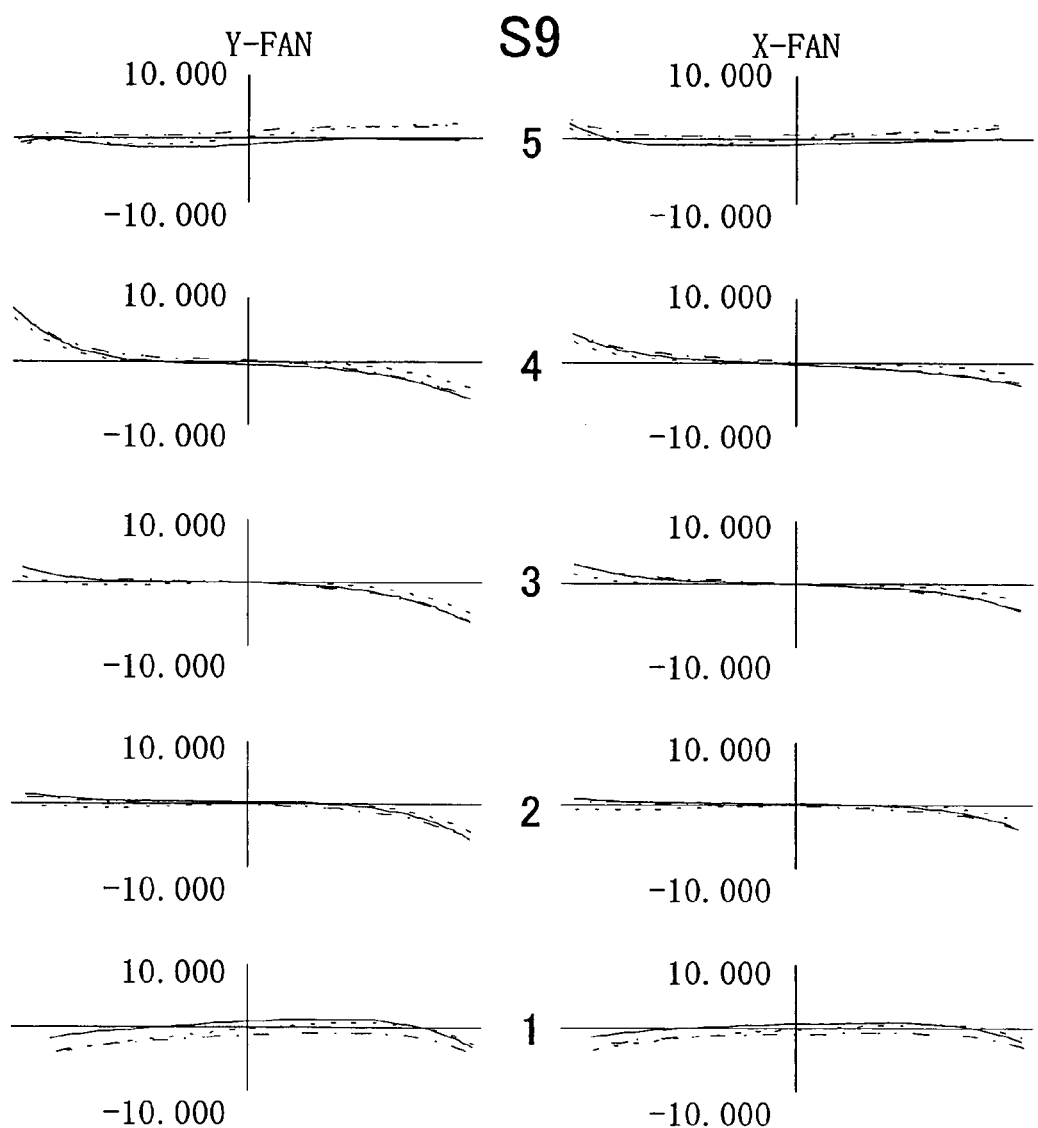
Figure 8J:
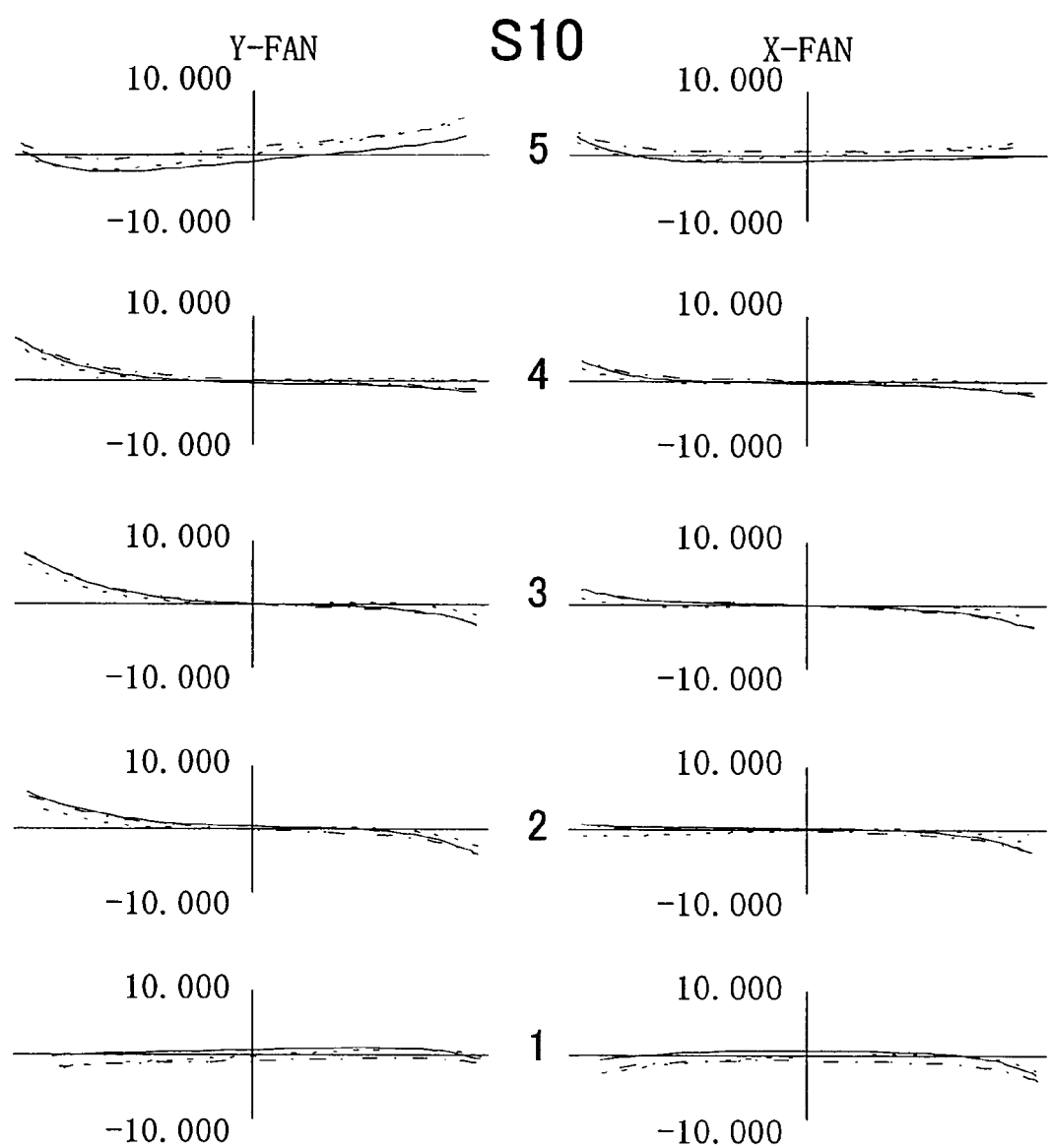
Figure 9A:
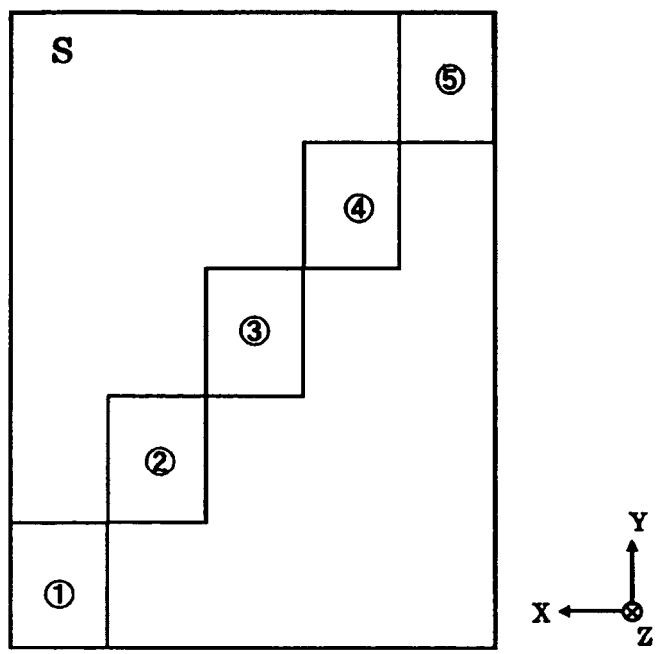
FIG. 9A shows a diagram illustrating evaluation positions for the imaging performance according to Embodiment 1 of the present invention.

In the projection optical system P of the present embodiment, appearances of distortions at the image display surfaces S1 to S10 (the image display surfaces S1 to S10 of FIG. 1) on the effective projection image surface E of the wide angle end, the middle zoom position and the telephoto end are shown in FIG. 7. The lateral aberration diagrams at the evaluation positions, which are shown in (1), (2), (3), (4) and (5) of FIG. 9A, on the respective image display surfaces S1 to S10 are shown in FIG. 8A to FIG. 8J. As can be seen from FIG. 7, large distortions are not present, and asymmetric distortions are also few. According to the definitions of the axes of the lateral aberration diagram of FIG. 8A to FIG. 8J, the horizontal axis represents the x or y axis on the pupil surface, and the vertical axis represents the aberration amount on the screen. Moreover, it is understood that the image is favorably formed at the respective image surface positions S1 to S10.

Figure 9B:
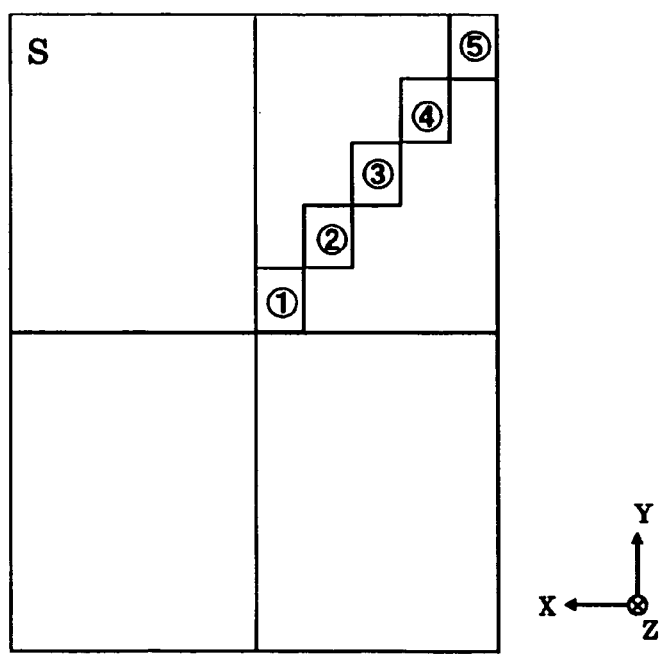
FIG. 9B shows a diagram illustrating evaluation positions for the imaging performance according to Embodiment 1 of the present invention.

Moreover, in the present embodiment, similar to the above description, the optical system C on the side of the image display panel LV has an image forming function on a spherical surface. The lateral aberration diagrams and distortions at the evaluation positions, which are shown by (1), (2), (3), (4) and (5) of FIG. 9B, on the image display surface S are shown in FIG. 6B to FIG. 6D and FIG. 6A. As can be seen from FIG. 6A, the image is favorably formed with no distortion. Moreover, the focal length of the optical system C' on the side of the image display panel LV is between 53.13 mm and 79.28 mm (1.5 times zoom).

EMBODIMENT 2

Figure 15:
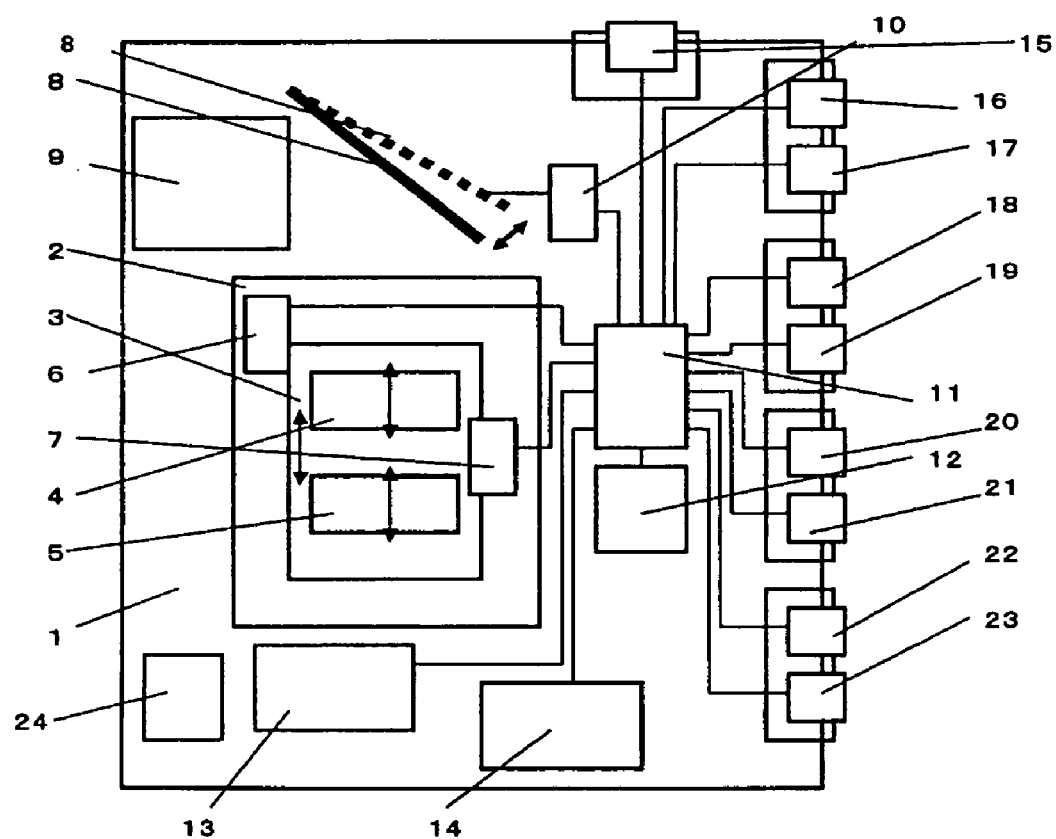
FIG. 15 shows a diagram illustrating the structure of a projection type image display apparatus according to Embodiment 2 of the present invention.
Figure 16:
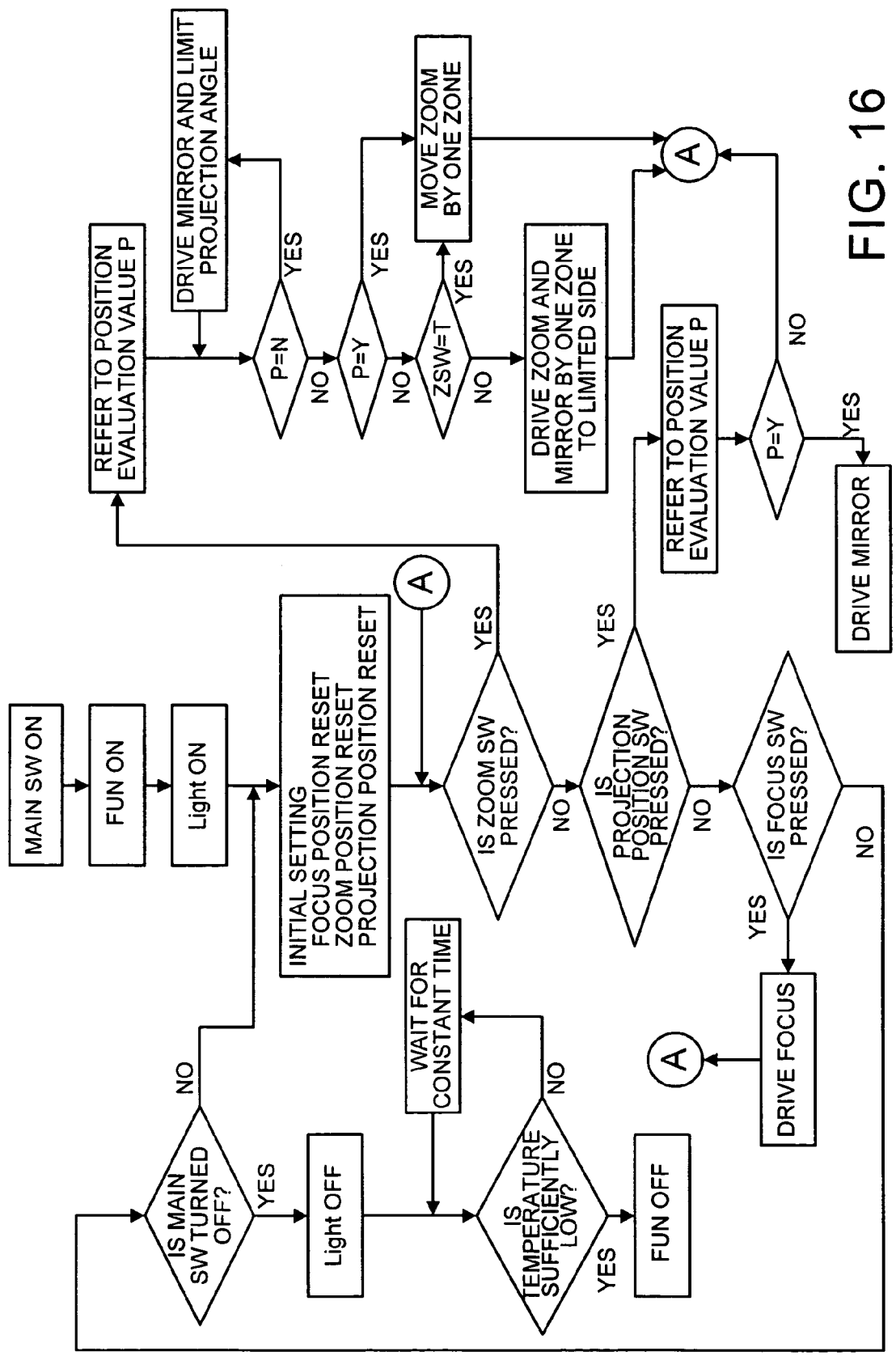
FIG. 16 shows a flowchart of the projection type image display apparatus according to Embodiment 2 of the present invention.

FIGS. 15 and 16 show the schematic view of an essential part and the flowchart of the operation of the projection type image display apparatus according to Embodiment 2 of the present invention.

Embodiment 2 of the projection type image display apparatus of the present invention will be described with reference to the structural diagram of FIG. 15 and the flowchart of FIG. 16.

In FIG. 15, Numeral 1 denotes the projection type image display apparatus. The projection optical system P comprises an optical unit 2 on the object surface side, an optical unit 9 on the image surface side, and the rotatable mirror member 8. The optical unit 2 comprises a mirror barrel member 3 which is moved in the optical axis direction by a focus drive portion 6 and changes the imaging relationship between the image display panel and the screen, to thereby change a focus. In addition, the optical unit 2 comprises a zoom portion system 4 and a zoom portion system 5 which change relative positions on the optical axis by a zoom drive portion 7, to thereby change the imaging magnification ratio.

Operating members based on projection operations onto the screen consist of a main switch 15, focus operating switches 16 and 17 for a member 16 up to a member 23, zoom operating switches 18 and 19, projection position adjusting switches 20 to 23 which change the rotation angles of the mirrors to change the position of the image to be projected, etc.

In the present apparatus, a CPU portion 11 allows the respective members to function according to a predetermined flow triggered by external operations, as shown in the flowchart. Numeral 12 denotes a memory which refers to data from the CPU 11. Numeral 14 denotes a power supply portion which supplies electric power to drive the apparatus, the CPU 11, an illumination portion 13, and a cooling member 24.

When the main switch 15 is turned on to drive the apparatus, the illumination portion 13 is turned on, the liquid crystal panel etc. (not shown) onto which an image is to be formed is turned into an active state, and then the image is formed. Further, the projected image is magnified and formed by means of the image forming actions of the optical units 2, 8 and 9, and then the cooling device 24 starts operation to avoid heating of the illumination portion 13.

In the present embodiment, the drive portions 6, 7 and 10 which change the zoom and focus of the optical unit 2 and the rotation angle of the rotatable mirror 8 are stepping motors STMs which are controlled by pulse signals transmitted from the CPU 11. When the electric power is turned on, the respective STMs move to initial positions to reset pulse counts.

When an operator wants to view an image projected on the screen surface in a larger magnified scale, he presses a magnification zoom switch W of the two zoom operating switches 18 and 19. Then the CPU 11 detects the input of the switch W and refers to the evaluation value map of FIG. 17 stored in the memory 12, to obtain the position evaluation value P. In the map of FIG. 17, according to the combination of the current zoom position from Z1 to Z8 and the angles of the rotatable mirror 8 from M1 to M16, any evaluation value P of Y, N and K is stored. Zi (i=1, 8) and Mj (j=1, 16) correspond to positions to be moved from the reset position, and the values of i and j are the predetermined numbers of pulses transmitted from the CPU 11. These pulses are arranged to refer to the numeric values stored in the CPU 11 or the memory 12.

With regard to the position of the zoom, Z1 is the wide angle end and Z8 is the telephoto end, and the mirror angles of M1 and M16 are the maximum angles to move the image in the left and right directions, respectively.

According to the motif of the present embodiment, the position evaluation value P is preferably Y or K in order to keep the maximum area of the position at which the image is projected, regardless of the change in the magnification power ratio by the zoom operation. If P is N, it is contrary to the motif. For example, there may be a problem in that the end portion of the image is deleted.

When the normal operation and processing are performed after the reset during power input time, the above problem is not caused. On the contrary, if P is N, the zoom is not driven but the rotatable mirror 8 is driven, such that the pulses are transmitted until the evaluation value P becomes Y. When the evaluation value P is Y, a problem is not present, so that the pulses for driving the zoom are transmitted to move it by one zone. When the evaluation value is neither N nor Y, it is K. In this case, the projection position is at a maximum vertically or horizontally in its zoom position. When P is K, the zoom ratio is moved by one zone toward the wide angle side, and further the pulse signal is also transmitted to the mirror drive portion 10, such that the zoom ratio is moved to the direction to limit the projection position. In that situation, the respective stepping motors STMs may be simultaneously driven. Alternatively, when simultaneous driving is limited by the load or when alternate driving is performed, the rotatable mirror 8 may be preferentially driven. When the image is demagnified by the zoom switch T, the above problem is not present and only zoom driving pulses may be transmitted.

When an operator wants to move horizontally or vertically the position at which the image is projected, and more specifically, the operator wants to move the position to the right direction, the projection position adjusting switch R is pressed. The CPU 11 detects this operation and simultaneously refers to the position evaluation value P. If P is Y, the CPU 11 receives the operation of the switch as it is and transmits the mirror drive pulse. When P becomes K or N, the CPU 11 does not accept the adjustment of the switch and stops driving the mirror. As described above, even though the operator presses the switch, if the angle of the rotatable mirror 8 can not be further changed or when it reaches the wide angle end or the telephoto end of the zoom, the processing such as buzzer warning may be performed.

As described above, according to the embodiment of the present invention, by using the optical system R having the off-axial reflective surfaces, an image can be projected obliquely to the screen E. Thus, it is possible to improve drastically the degrees of freedom for setting up the projection type image display apparatus. Further, by rotating the member G in the projection optical system P around the position of the exit pupil of the optical system C on the side of the image display panel LV, it is possible to attain the projection optical system which is capable of varying the projection angle to obtain the projected image with no distortion at a certain image position within the specification range of the large projection angle with an extremely broad field angle as compared with the prior art, and the projection type image display apparatus comprising the projection optical system. In addition, even though the image is magnified or demagnified by the zoom of the optical system C on the side of the image panel LV, the projectable region on the screen E can be kept constant. Thus, it is possible to attain the projection optical system in which the degree of freedom for setup positions is further improved and the projection type image display apparatus comprising the projection optical system.

In the projection optical system P of the present embodiment, the optical system R on the image surface side includes the curved reflective surfaces as the structural elements. Thus, by arranging the optical system R including the curved reflective surfaces as the structural elements on the image surface side, it is possible to attain the compact projection optical system which is capable of projecting the image obliquely to the predetermined image surface.

In the projection optical system of the present embodiment, the optical system R on the image surface side guides the projected image created in the optical system C on the object surface side and projects the projected image obliquely to the predetermined planar image surface (screen) E for image forming.

The optical system C on the object surface side is comprised of the coaxial rotationally symmetric lenses having the zoom function. In principle, in the case of a refractive system to be acceptable, the spacing between surfaces can be made narrower than that of the structure having reflective surfaces. Moreover, it is possible to reduce the manufacturing sensitivity.

The optical system C on the object surface side forms the projected image on the substantially spherical surface, and thus it is possible to obtain high optical performance.

The position of the exit pupil of the optical system C on the object surface side is substantially constant. Thus, the distance from the image display panel LV to the exit pupil EXP and the distance from the exit pupil EXP to the region B1' are kept constant. Therefore, it is advantageous in that the position of the rotatable mirror G provided in the vicinity of the position of the exit pupil is fixed.

In the projection optical system of the present embodiment, the position of the exit pupil of the optical system C on the object surface side is disposed between the optical system C on the object surface side and the optical system R on the image surface side. Thus, in case the member G which rotates around the position of the exit pupil of the optical system C on the object surface side is comprised of at least one planar mirror provided in the vicinity of the position of the exit pupil, it is easy to secure the setup space.

In the projection optical system of the present embodiment, the member G which rotates around the position of the exit pupil of the optical system C on the object surface side is the optical system C on the object surface side. Thus, in the case where the rotatable member G is the optical system on the object surface side, it is possible to reduce the setup space compared with the arrangement of the rotatable mirror.

In the projection optical system of the present embodiment, the member G which rotates around the position of the exit pupil of the optical system C on the object surface side is the optical system on the image surface side. Thus, in the case where the rotatable member G is the optical system on the image surface side, it is possible to reduce the setup space compared with the arrangement of the rotatable mirror.

In the projection optical system of the present embodiment, the member G which rotates around the position of the exit pupil of the optical system C on the object surface side is at least one planar mirror which is provided in the vicinity of the exit pupil. Thus, in the case where the rotatable member is the planar mirror, the rotatable member has a smaller size compared with the rotation of the optical system on the object surface side or the image surface side. Therefore, it is possible to attain a compact mechanism which rotates the member.

According to the embodiment of the present invention, based on the principle of varying the projection angle, the direction of a light ray incident on the optical system on the image surface side is changed using the rotatable member, such that the image is moved or tilted. For example, in the case where the image surface center is moved by $S_{x,z}$ in the horizontal direction from the center of the predetermined image surface at a zoom ratio z, the ratio of half the width of the image surface $L_{x,z}$ in the horizontal direction to the movement amount $S_{x,z}$ of the image surface in the horizontal direction is preferably equal to the ratio of the maximum half field angle $\omega_{r,z}$ of the exit side of the optical system on the object surface side to the change amount $M \cdot \theta_{Mx,z}$ of the angle of the exit light ray by the rotation amount $\theta_{Mx,z}$ of the member. However, actually, there is some latitude in the tolerances of the optical specifications, such as aberration amount, positioning precision of the moving image surface and distortion. Thus, as long as the specifications are satisfied within the range of the tolerances, both the ratios must not necessarily be exactly equal. If the above-mentioned conditional expression (1) is not satisfied, the principle for varying the projection angle according to the present invention is not satisfied, and it becomes difficult to correct the aberrations. Thus, there is a problem in that the image surface does not move to a desired position corresponding to the rotation amount when focused. Moreover, as regards the parameter M which depends on the rotatable member, when the rotatable member is a mirror, it must be noted that the change amount of the directions of the light ray by reflection becomes twice of the rotation amount.

According to the embodiment of the present invention, the plurality of optical systems are provided in the projection optical system, and each of the optical systems has a predetermined role. Thus, the projected image can be moved or tilted in the predetermined image surface. Further, even when the zoom is performed, the range in which the projected image can be moved can be kept constant. Here, The region in which the projected image can be moved, that is, the projectable region (effective projection region), is unchanged (constant). This means that the maximum region in which optical performance on the predetermined image surface is ensured is unchanged. Within that region, it is possible to limit the region to be displayed arbitrarily by limiting the maximum rotation amount of the rotatable member.

While preferred embodiments have been described, it is to be understood that modification and variation of the present invention may be made without departing from the scope of the following claims.

What is claimed is:

1. A projection type image display apparatus comprising:
   an image display panel; and
   a projection optical system which projects an image of the image display panel onto an effective projection region of a predetermined image surface,
   wherein the projection optical system comprises,
   a first optical system which includes a zoom portion zooming the projected image on the effective projection region and has coaxial rotationally symmetric lenses,
   a second optical system which is disposed on the image surface side of the first optical system, and
   one or more rotatable members which rotate around a position of an exit pupil of the first optical system or its vicinity;

wherein, by rotating the one or more rotatable members, the projected image is moved within the effective projection region; and wherein the following expression is satisfied:

$$\|\omega_{r,z} \cdot S_{r,z}/(M \cdot \theta_{Mr,z} L_{r,z})|-1|<0.2,$$

where $\theta_{Mr,z}$ is a rotation amount of the rotatable member in a horizontal or vertical direction at a zoom ratio z of the zoom portion, $\omega_{r,z}$ is a maximum half field angle of an exit side of the first optical system, $L_{r,z}$ is half a size of the projected image on the effective projection region, $S_{r,z}$ is a movement amount of the projected image, and M is a parameter depending on the rotatable member, when the rotatable member is the first optical system or the second optical system, M is 1, and when the rotatable member is a planar mirror, M is 2.

2. The projection type image display apparatus according to claim 1,
wherein the second optical system comprises a plurality of reflective surfaces each having curvature.

3. The projection type image display apparatus according to claim 1,
wherein the second optical system guides the projected image by the first optical system and projects the projected image on a surface obliquely tilted to a principal ray to be emitted from the first optical system.

4. The projection type image display apparatus according to claim 1,
wherein the first optical system has capability to form the image of the image display panel on a substantially spherical surface.

5. The projection type image display apparatus according to claim 1,
wherein the position of the exit pupil of the first optical system is substantially constant during zoom operation of the zoom portion.

6. The projection type image display apparatus according to claim 1,
wherein the position of the exit pupil of the first optical system is disposed between the first optical system and the second optical system.

7. The projection type image display apparatus according to claim 1,
wherein one of the one or more rotatable members is the first optical system.

8. The projection type image display apparatus according to claim 1,
wherein one of the one or more rotatable members is the second optical system.

9. The projection type image display apparatus according to claim 1,
wherein one of the one or more rotatable members is a planar mirror provided in the position of the exit pupil of the first optical system or its vicinity.

10. The projection type image display apparatus according to claim 1,
wherein, during zoom operation by the first optical system, the size of the effective projection region is substantially constant.

11. The projection type image display apparatus according to claim 1,
wherein the one or more rotatable members are planar mirrors arranged in the position of the exit pupil of the first optical system or its vicinity, and
by rotating the planar mirrors around the position of the exit pupil of the first optical system or its vicinity, the projected image is moved within the effective projection region.

12. The projection type image display apparatus according to claim 1, further comprising:
a controller which controls the zoom position of the zoom portion and the rotation angle of the one or more rotatable members such that the projected image is moved within the effective projection region.

13. A projection type image display apparatus comprising:
an image display panel; and
a projection optical system which projects an image of the image display panel onto an effective projection region of a predetermined image surface,
wherein the projection optical system comprises,
a first optical system which includes a zoom portion zooming the projected image on the effective projection region,
a second optical system which is disposed on the image surface side of the first optical system, and
one or more rotatable members which rotate around a position of an exit pupil of the first optical system or its vicinity;
wherein, by rotating the one or more rotatable members, the projected image is moved within the effective projection region; and
wherein the following expression is satisfied:

$$\|\omega_{r,z} \cdot S_{r,z}/(M \cdot \theta_{Mr,z} L_{r,z})|-1|<0.2,$$

where $\theta_{Mr,z}$ is a rotation amount of the rotatable member in a horizontal or vertical direction at a zoom ratio z of the zoom portion, $\omega_{r,z}$ is a maximum half field angle of an exit side of the first optical system, $L_{r,z}$ is half a size of the projected image on the effective projection region, $S_{r,z}$ is a movement amount of the projected image, and M is a parameter depending on the rotatable member when the rotatable member is the first optical system or the second optical system , M is 1, and when the rotatable member is a planar mirror, M is 2.

* * * * *